United States Patent
Iwase et al.

(10) Patent No.: US 9,094,585 B2
(45) Date of Patent: Jul. 28, 2015

(54) IMAGING DEVICE, IMAGE PROCESSING METHOD AND PROGRAM

(75) Inventors: Ayako Iwase, Kanagawa (JP); Yuji Saitou, Tokyo (JP); Takashi Nunomaki, Kanagawa (JP); Nobuki Furue, Tokyo (JP); Shinichi Iriya, Kanagawa (JP); Hiroyuki Ozawa, Tokyo (JP)

(73) Assignee: SONY CORPORATION, Tokyo (JP)

(*) Notice: Subject to any disclaimer, the term of this patent is extended or adjusted under 35 U.S.C. 154(b) by 599 days.

(21) Appl. No.: 12/776,856

(22) Filed: May 10, 2010

(65) Prior Publication Data

US 2010/0310232 A1    Dec. 9, 2010

(30) Foreign Application Priority Data

Jun. 3, 2009   (JP) ................................ 2009-134417

(51) Int. Cl.
*H04N 5/84*      (2006.01)
*H04N 1/21*      (2006.01)
*G11B 27/34*     (2006.01)
*H04N 1/00*      (2006.01)
*H04N 5/232*     (2006.01)
*H04N 5/77*      (2006.01)

(52) U.S. Cl.
CPC .............. *H04N 1/2112* (2013.01); *G11B 27/34* (2013.01); *H04N 1/00411* (2013.01); *H04N 1/00453* (2013.01); *H04N 1/00474* (2013.01); *H04N 5/23216* (2013.01); *H04N 5/23293* (2013.01); *H04N 5/772* (2013.01)

(58) Field of Classification Search
None
See application file for complete search history.

(56) References Cited

U.S. PATENT DOCUMENTS

| 6,408,301 B1* | 6/2002 | Patton et al. ................... 707/741 |
| 2008/0152299 A1* | 6/2008 | Ubillos .......................... 386/52 |
| 2010/0026719 A1 | 2/2010 | Ozawa et al. |
| 2010/0037135 A1 | 2/2010 | Iwase et al. |
| 2010/0053216 A1 | 3/2010 | Iwase et al. |
| 2010/0053355 A1 | 3/2010 | Iwase et al. |
| 2010/0110228 A1 | 5/2010 | Ozawa et al. |
| 2010/0123734 A1 | 5/2010 | Ozawa et al. |
| 2010/0125786 A1 | 5/2010 | Ozawa et al. |
| 2010/0134415 A1 | 6/2010 | Iwase et al. |
| 2010/0145982 A1 | 6/2010 | Iwase et al. |

FOREIGN PATENT DOCUMENTS

| JP | 09-074575 A | 3/1997 |
| JP | 2000-138888 A | 5/2000 |

(Continued)

OTHER PUBLICATIONS

Office Action issued Oct. 14, 2014 in Japanese Patent Application No. 2014-001508.

*Primary Examiner* — William C Vaughn, Jr.
*Assistant Examiner* — Daniel Tekle
(74) *Attorney, Agent, or Firm* — Oblon, McClelland, Maier & Neustadt, L.L.P.

(57) ABSTRACT

There is provided an imaging device including, an operating portion on which are input a recording start instruction and a recording stop instruction, a recording portion that records onto a recording medium moving images that are picked up during a recording period from the recording start instruction to the recording stop instruction, a thumbnail generation portion that generates a plurality of thumbnail images that represent each of sections obtained by time division of the moving images, and a display control portion that displays a recorded image verification screen on a display portion immediately after the recording stop instruction, the plurality of thumbnail images being arranged in chronological order on the recorded image verification screen.

19 Claims, 13 Drawing Sheets

(56) References Cited

FOREIGN PATENT DOCUMENTS

| JP | 2000-350135 A | 12/2000 |
|---|---|---|
| JP | 2004-363823 A | 12/2004 |
| JP | 2005-340904 | 12/2005 |
| JP | 2007-124538 A | 5/2007 |
| JP | 2008-011044 A | 1/2008 |
| JP | 2008-078837 A | 4/2008 |

* cited by examiner

IMAGING DEVICE, IMAGE PROCESSING METHOD AND PROGRAM

BACKGROUND OF THE INVENTION

1. Field of the Invention

The present invention relates to an imaging device, an image processing method and a program.

2. Description of the Related Art

When performing pickup of still images (photographs, for example) on an imaging device such as a digital still camera or the like, immediately after a still image is taken and recorded in response to depression of a shutter button, the recorded still image is automatically displayed for a predetermined period of time only (auto review) and after that period of time an operation generally moves to an image pickup standby state (as disclosed, for example, in Japanese Patent Application Publication No. JP-A-2005-340904). Using this type of auto review function, a user can verify content of the recorded still image immediately after image pickup without performing any particular operation. For that reason, when the user decides that the image pickup is unsuccessful, the user can delete the recorded still image, repeat the image pickup operation and so on.

On the other hand, when performing pickup of moving images using the imaging device such as the digital still camera or the like, once recording of the moving images is ended in response to depression of a recording stop button, an operation generally moves from a recording state to a recording standby state. The auto review function of the above-described still image pickup is not available with this type of moving image pickup.

SUMMARY OF THE INVENTION

One reason why the auto review function does not exist for moving images, as described above, rests in the fact that, in contrast to instantaneous still image pickup, moving image pickup includes the concept of a recording time. For example, as an auto review immediately after moving image pickup, when the recorded moving images are played back or displayed from the beginning, an auto review time is different depending on the recording time of each of the moving images. Furthermore, when the recording time is long, auto review immediately after moving image pickup takes a long time, and a timing to perform the next recording may be missed. As a result, a method is demanded in which it is possible to accurately check content of recorded moving images in a constant time, regardless of the recording time.

Furthermore, the still image is a single image that is picked up at a specific time point, and thus, if a user sees the still image, he/she can instantly ascertain the content. As a consequence, even if time elapses from the time of image pickup, it is comparatively easy to ascertain the content of the still image and to determine whether or not the still image is needed. In contrast, with moving images, there is the concept of recording time, and thus, if time elapses from the time of image pickup, operations to check the content of the recorded moving images, to determine whether or not the moving images are needed and to edit the moving images etc. are complicated. For example, it is conceivable that, after a certain period of time has elapsed from the moving image pickup, the user determines whether or not the recorded moving images are needed and intends to delete all or part of the moving images. In this case, it is necessary for the user to play back the moving images from the beginning, take time to check the content of the moving images, and then determine whether or not to delete the moving images. In particular, when the recording time of the moving images is long, this type of operation is extremely inefficient and complicated.

The user's memory is fresh immediately after pickup of the moving images, and the user can easily determine whether or not to delete the recorded moving images. In addition, because the user's memory is fresh, it is appropriate timing to perform editing and other operations on the recorded moving images immediately after pickup of the moving images.

In light of the foregoing, it is desirable to accurately show a user content of recorded moving images immediately after pickup of the moving images, while the user's memory is still fresh.

According to an embodiment of the present invention, there is provided an imaging device including, an operating portion on which are input a recording start instruction and a recording stop instruction, a recording portion that records onto a recording medium moving images that are picked up during a recording period from the recording start instruction to the recording stop instruction, a thumbnail generation portion that generates a plurality of thumbnail images that represent each of sections obtained by time division of the moving images, and a display control portion that displays a recorded image verification screen on a display portion immediately after the recording stop instruction, the plurality of thumbnail images being arranged in chronological order on the recorded image verification screen.

The recorded image verification screen may further include at least one function icon that indicates a predetermined function that can be performed on the moving images recorded onto the recording medium, and wherein the imaging device further includes, a position detecting portion that detects a position in which an operating body touches or approaches a display screen of the display portion; and a function control portion that performs the predetermined function corresponding to the function icon on at least some of the sections of the moving images recorded on the recording medium, when the position on the display screen detected by the position detecting portion during display of the recorded image verification screen corresponds to a display position of the function icon.

When a first position on the display screen detected by the position detecting portion during display of the recorded image verification screen corresponds to a display position of at least one thumbnail image among the plurality of thumbnail images, and when a second position on the display screen detected by the position detecting portion corresponds to a display position of the function icon, the function control portion may perform the predetermined function corresponding to the function icon on the section of the moving images that corresponds to the at least one thumbnail image.

The predetermined function may include at least one of a function that deletes at least some of the sections of the moving images recorded on the recording medium, a function that assigns an evaluation value to at least some of the sections of the moving images recorded on the recording medium, and a function that plays back at least some of the sections of the moving images recorded on the recording medium.

The imaging device may further comprising, a position detecting portion that detects a position in which an operating body touches or approaches a display screen of the display portion. When a predetermined input operation performed on two thumbnail images among the plurality of thumbnail images on the recorded image verification screen is detected by the position detecting portion, the thumbnail generation portion may set at least three sub-sections that are obtained by segmentalizing the sections of the moving images corresponding to the two thumbnail images and generates at least three thumbnail images corresponding to each of the subsections, and the display control portion may display the at least three thumbnail images on the recorded image verification screen.

The display control portion may display each of the thumbnail images on the recorded image verification screen in a display format that accords with a time length of the section corresponding to each of the thumbnail images.

The imaging device may further include, an index operating portion on which is input an index instruction; and an index information generating portion that generates index information indicating a time point at which the index instruction is input during the recording period. The thumbnail generation portion may extract as the thumbnail image a frame of the time point indicated by the index information, from among the moving images picked up during the recording period.

The imaging device may further include, a positioning portion that measures a current position of the imaging device during the recording period and generates position information indicating the current position of the imaging device, wherein the display control portion displays a map screen on the display portion immediately after the recorded image verification screen is displayed, the map screen including a map onto which an image pickup position of the moving images is mapped in accordance with the position information.

When the plurality of thumbnail images are displayed on the recorded image verification screen, the display control portion may display the plurality of thumbnail images one by one in reverse chronological order.

According to another embodiment of the present invention, there is provided an image processing method, comprising the steps of, recording onto a recording medium moving images that are picked up during a recording period from a recording start instruction to a recording stop instruction, generating a plurality of thumbnail images that represent each of sections obtained by time division of the moving images; and displaying a recorded image verification screen on a display portion immediately after the recording stop instruction, the plurality of thumbnail images being arranged in chronological order on the recorded image verification screen.

According to another embodiment of the present invention, there is provided a program that comprises instructions that command a computer to perform the steps of, recording onto a recording medium moving images that are picked up during a recording period from a recording start instruction to a recording stop instruction, generating a plurality of thumbnail images that represent each of sections obtained by time division of the moving images; and displaying a recorded image verification screen on a display portion immediately after the recording stop instruction, the plurality of thumbnail images being arranged in chronological order on the recorded image verification screen.

According to another embodiment of the present invention, there is provided a computer readable recording medium storing a program that comprises instructions that command a computer to perform the steps of, recording onto a recording medium moving images that are picked up during a recording period from a recording start instruction to a recording stop instruction, generating a plurality of thumbnail images that represent each of sections obtained by time division of the moving images; and displaying a recorded image verification screen on a display portion immediately after the recording stop instruction, the plurality of thumbnail images being arranged in chronological order on the recorded image verification screen.

With the above-described structure, the moving images picked up during the recording period from the recording start instruction to the recording stop instruction are recorded onto the recording medium, the plurality of thumbnail images that represent each section of the moving images that have been time divided are generated, and, immediately after the recording stop instruction, the recorded image verification screen is displayed on the display portion, the plurality of thumbnail images being arranged in chronological order on the recorded image verification screen. In this manner, immediately after the recording period in which the moving images are picked up and recorded, the recorded image verification screen that includes the plurality of thumbnail images that show the content of the moving images recorded on the recording medium is automatically displayed on the display portion and thus shown to the user.

According to the embodiments of the present invention described above, the content of the recorded moving images can be accurately shown to a user immediately after pickup of the moving images, while the user's memory is still fresh.

DETAILED DESCRIPTION OF THE EMBODIMENT(S)

Figure 1:
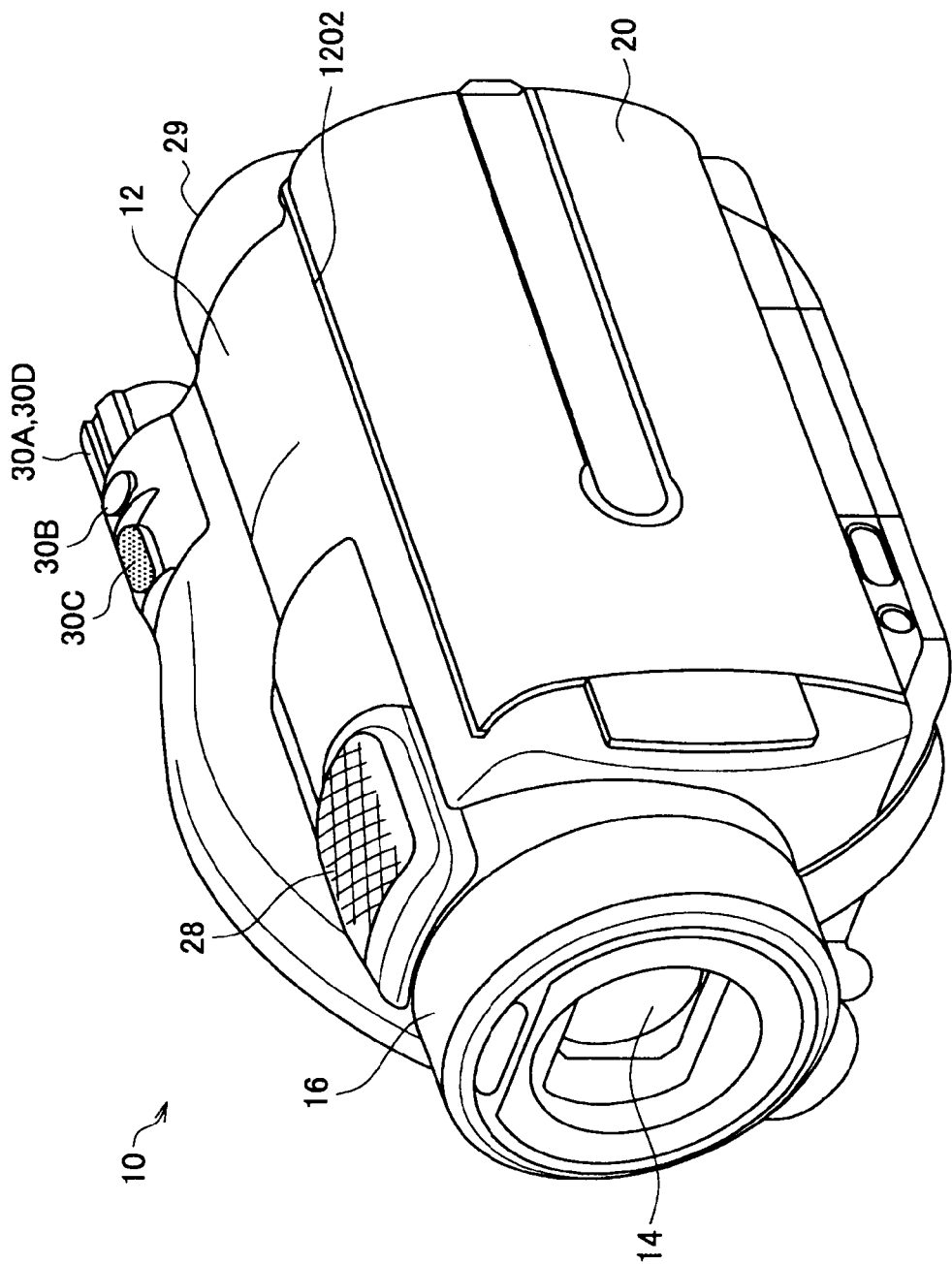
FIG. 1 is a perspective view showing an external structure of a front surface side of an imaging device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An explanation will be given in the following order.
1. First embodiment (display of recorded image verification screen)
2. Second embodiment (display switchover between recorded image verification screen and map screen)
3. Third embodiment (change in display format of thumbnail images on recorded image verification screen)
4. Fourth embodiment (segmentalization of thumbnail images on recorded image verification screen)

1. First Embodiment

Structure of Imaging Device

Figure 2:
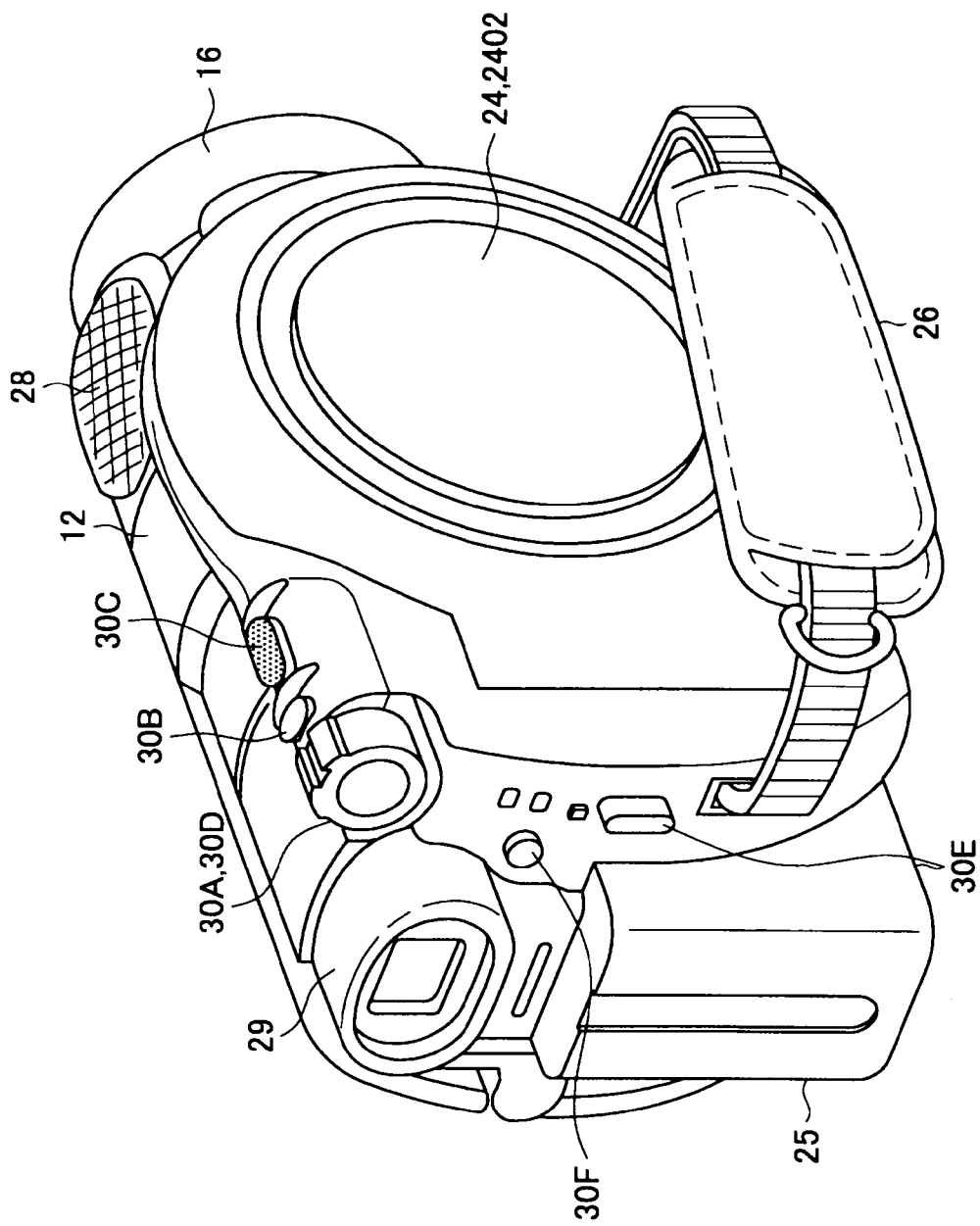
FIG. 2 is a perspective view showing an external structure of a rear surface side of the imaging device according to the first embodiment.
Figure 3:
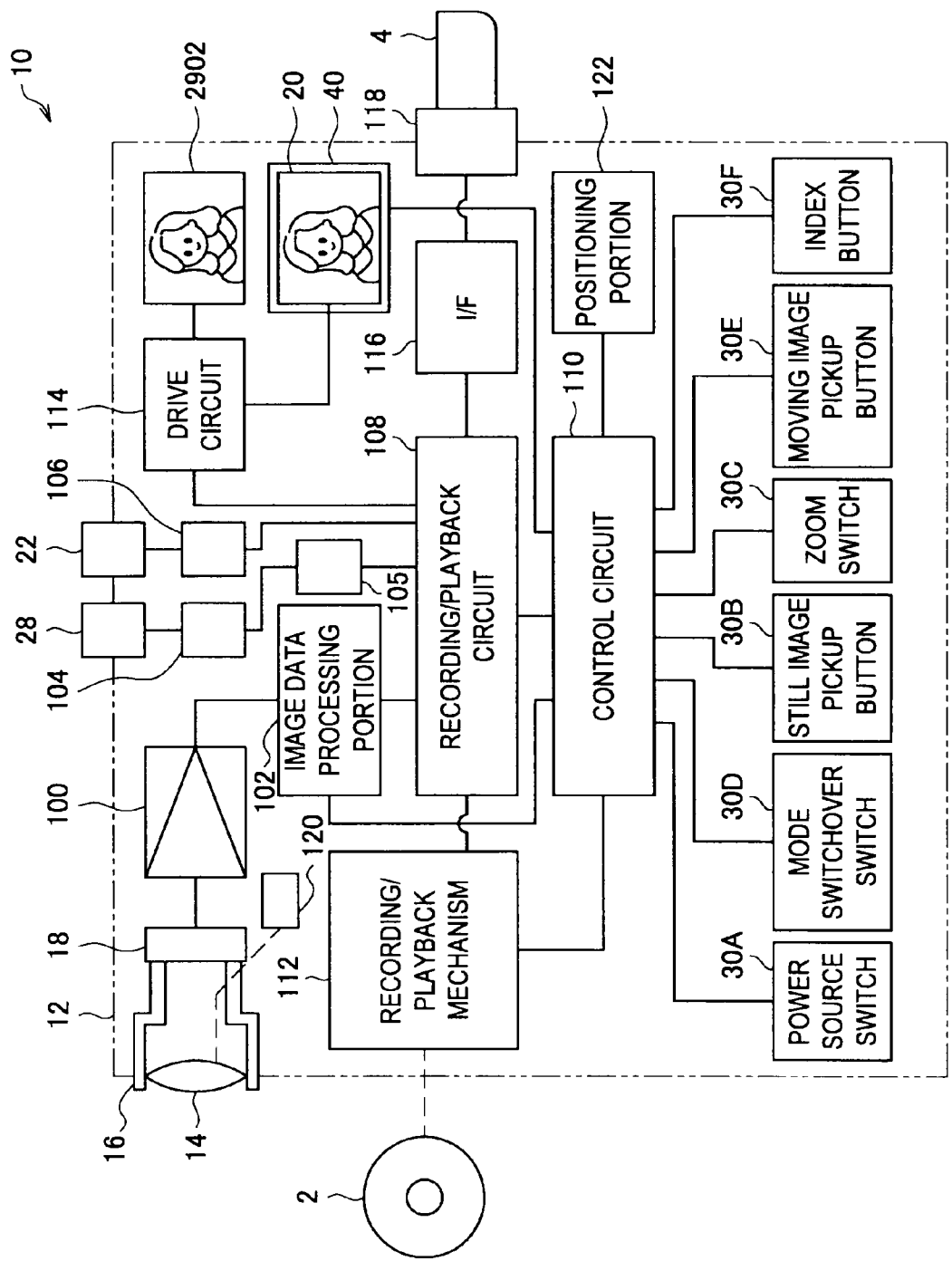
FIG. 3 is a block diagram showing a hardware configuration of the imaging device according to the first embodiment.

First, a structure of an imaging device according to a first embodiment of the present invention will be explained with reference to FIG. 1 to FIG. 3. FIG. 1 and FIG. 2 are perspective views showing an external structure of a front surface side and a rear surface side of an imaging device 10 according to the first embodiment. FIG. 3 is a block diagram showing a hardware configuration of the imaging device 10 according to the first embodiment.

As shown in FIG. 1 and FIG. 2, the imaging device 10 according to the first embodiment is, for example, a digital video camera, and has functions to capture and record moving images. However, the imaging device according to the present invention is not limited to the example of the digital video camera and can also be applied to any chosen electronic device, as long as it is capable of recording moving images where a photographic subject is continuously captured. It can be, for example, a digital still camera that has a moving image capture function, a mobile telephone, a personal digital assistant (PDA), a mobile video/music player, a game console, or the like.

A case 12 that forms an exterior of the imaging device 10 has dimensions in which a length in the front-to-rear direction and a height in the vertical direction are longer than a width in the left-to-right direction. Note that, in the present specification, the left and right are defined in a state in which the imaging device 10 is seen from the rear, and also, a photographic subject side in a direction of an optical axis of an image pickup optical system is referred to as the front, and a side of an image pickup element is referred to as the rear.

A lens barrel 16 with a built-in image pickup optical system 14 is provided on a front section of an upper portion of the case 12. The lens barrel 16 extends in the front-to-rear direction such that a front portion of the lens barrel 16 faces a front surface of the case 12. An image pickup element 18 (refer to FIG. 3), which picks up an image of a photographic subject introduced by the image pickup optical system 14, is provided on a rear end of the lens barrel 16.

As shown in FIG. 1, a display panel 20 is provided openably-closeably on a left side portion of the case 12, and when the display panel 20 is closed, it is housed in a storage recess 1202. The display panel 20 is an example of a display portion to display images etc. picked up by the image pickup element 18, and is formed, for example, of a liquid crystal display (LCD) or an organic electro-luminescence (EL) display. Note that a speaker 22 (refer to FIG. 3), which outputs played back audio data, is provided on a bottom wall of the storage recess 1202.

As shown in FIG. 2, a grip belt 26 that extends in the front-to-rear direction is provided on a right side surface of the case 12. Further, a storage portion 24 is provided on a right side portion of the case 12, the storage portion 24 detachably storing a disk-shaped recording medium 2 (refer to FIG. 3) that records image data and audio data. The storage portion 24 is opened and closed using an open/close cover 2402. The disk-shaped recording medium 2 is an optical disk, such as, for example, a Blu-ray disc, a digital versatile disc (DVD) or a compact disc (CD) etc. Note that the recording medium to record picked up images may be a recording medium other than the above-described optical disk, and may be, for example, a chosen removable medium known as a semiconductor memory, such as magneto-optical disk or a memory card 4 (refer to FIG. 3). Alternatively, the recording medium may be a built-in recording medium, such as a hard disk built into the imaging device 10.

Furthermore, a microphone 28 that collects sound is provided on a front portion of an upper surface of the case 12. An electronic viewfinder device 29 with a built-in compact display device 2902 (refer to FIG. 3) is provided on a rear portion of the upper surface of the case 12. In addition, a battery 25 is detachably mounted on a lower portion of a rear surface of the case 12.

In addition, as shown in FIG. 1 and FIG. 2, as operating portions to instruct execution of various functions relating to image pickup, the imaging device 10 is provided with, for example, a power source switch 30A, a still image pickup button 30B, a zoom switch 30C, a mode switchover switch 30D, a moving image pickup button 30E and an index button 30F etc. The moving image pickup button 30E is an operating tool for a user to instruct the imaging device 10 to start or end recording of picked up moving images, and is used both as a recording start button and a recording stop button. When the user decides a composition of a photographic subject he/she wishes to capture and depresses the moving image pickup button 30E, the imaging device 10 starts a recording operation, and when the user once more depresses the moving image pickup button 30E, the imaging device 10 stops the recording operation. Note that the recording operation is an operation in which data of images (moving images formed by a plurality of frames) that are continuously picked up by the above-described image pickup element 18 are recorded onto the recording medium.

Next, an internal structure of the imaging device 10 will be explained in detail with reference to FIG. 3. As shown in FIG. 3, the imaging device 10 is provided with the above-described case 12, the image pickup optical system 14, the lens barrel 16, the image pickup element 18, the display panel 20, the speaker 22, the microphone 28 and the variety of operating portions 30A to 30F. Additionally, the imaging device 10 is provided with a touch panel 40, a video signal amplifier circuit 100, an image data processing portion 102, a microphone amplifier circuit 104, an audio data processing circuit 105, an output amplifier circuit 106, a recording/playback circuit 108, a control circuit 110, a recording/playback mechanism 112, a drive circuit 114, an interface circuit 116, a memory card slot 118, a zoom drive portion 120 and a positioning portion 122.

The image pickup optical system 14, the lens barrel 16, the image pickup element 18 and the zoom drive portion 120 etc. all function as an image pickup portion 200 (refer to FIG. 4) that picks up an image of a photographic subject and outputs an image pickup signal. The image pickup optical system 14 is formed of a variety of lenses, such as a focus lens and a zoom lens, and of optical components, such as an optical filter that eliminates unnecessary wavelengths, an aperture and so on. Light that is incident from the photographic subject is introduced into the image pickup element 18 via each of the optical components of the image pickup optical system 14. The image pickup element 18 is, for example, a solid-state imaging element, such as a charge coupled device (CCD) or a complementary metal oxide semiconductor (CMOS). The image pickup element 18 performs photoelectric conversion on the light introduced via the image pickup optical system 14, and outputs an image pickup signal (analog video signal) that represents the picked up image of the photographic subject.

The video signal amplifier circuit 100 and the image data processing portion 102 function as an image processing portion 210 (refer to FIG. 4) that performs signal processing on the image pickup signal generated by the image pickup portion 200 and generates image data. The image pickup signal generated by the above-described image pickup element 18 is amplified by the video signal amplifier circuit 100 and supplied to the image data processing portion 102. The image data processing portion 102 performs predetermined signal processing on the image pickup signal to generate image data (moving image data or still image data), and then supplies the generated image data to the recording/playback circuit 108. The predetermined signal processing is, for example, analog signal processing, such as correlated double sampling (CDS) processing or gain processing using a programmable gain amplifier (PGA), or is digital signal processing, such as A/D conversion processing, gamma correction processing, white balance processing or the like.

Further, an audio signal collected by the microphone 28 is amplified by the microphone amplifier circuit 104, and is supplied to the recording/playback circuit 108 as audio data on which the audio data processing circuit 105 has performed predetermined signal processing.

The recording/playback circuit 108 and the recording/playback mechanism 112 function as a recording/playback portion 220 (refer to FIG. 4) that records various data, such as image data and audio data, onto the recording medium, and also plays back the various data recorded on the recording medium. The recording/playback circuit 108 controls the recording/playback mechanism 112 based on instructions from the control circuit 110, and thus records and plays back data on the disk-shaped recording medium 2.

For example, in accordance with control of the control circuit 110, the recording/playback circuit 108 supplies to the recording/playback mechanism 112 the image data (moving image data or still image data) supplied from the image data processing portion 102 and the audio data supplied from the audio data processing portion 105. The recording/playback mechanism 112 records the moving image data, the still image data and the audio data onto the disk-shaped recording medium 2.

Further, via the interface circuit 116, the recording/playback circuit 108 records the moving image data or still image data supplied from the image data processing portion 102 and the audio data supplied from the audio data processing portion 105 onto the memory card 4 installed in the memory card slot 118.

In addition, in accordance with control of the control circuit 110 and via the drive circuit 114, the recording/playback circuit 108 supplies the moving image data or still image data supplied from the image data processing portion 102 to the display panel 20 and the display device 2902 and causes the image to be displayed.

Additionally, along with supplying moving image data or still image data supplied from the memory card 4 via the interface circuit 116 to the display panel 20 and the display device 2902 via the drive circuit 114 and causing the image to be displayed, the recording/playback circuit 108 also supplies audio data supplied from the memory card 4 via the interface circuit 116 to the speaker 22 via the output amplifier circuit 106 and causes the audio to be output.

Furthermore, along with supplying moving image data or still image data played back by the recording/playback mechanism 112 from the disk-shaped recording medium 2 to the display panel 20 and the display device 2902 via the drive circuit 114 and causing the image to be displayed, the recording/playback circuit 108 also supplies audio data played back by the recording/playback mechanism 112 from the disk-shaped recording medium 2 to the speaker 22 via the output amplifier circuit 106 and causes the audio to be output.

The display panel 20 and the display device 2902 function as display portions that display the various image data (moving image data, still image data) supplied in the manners described above. For example, the display panel 20 and the display device 2902 display the moving images (live view images) that are input in real time from the recording/playback circuit 108 during image pickup. In this way, while watching moving images being picked up by the imaging device 10, the user can perform image pickup operations (a zooming operation, an instruction to start recording, an instruction to end recording, an operation to input index instructions etc.) and can thus pick up an image of a selected photographic subject with a selected composition. Furthermore, when the moving images recorded on the recording media 2 and 4 are played back by the recording/playback circuit 108, the display portions displays the playback images input from the recording/playback circuit 108. In this way, the user can verify the content of the moving images recorded on the recording media 2 and 4.

The touch panel 40 functions as a position detecting portion that detects a position in which an operating body touches or approaches a display screen of the display panel 20. The touch panel 40 is overlaid with the display panel 20, and is equipped with a sensor that detects a position on the display screen when the operating body touches or approaches the display screen. In this way, the touch panel 40 can detect the position on the display screen that is specified by the operating body, and can detect a movement trajectory and a movement speed of the operating body. The operating body used to operate the touch panel 40 is, for example, a finger of the user, a stylus or a touch pen, etc. The touch panel 40 detects the position at which the operating body touches or approaches the display screen as coordinates, and the coordinates detected by the touch panel 40 are transmitted to the control circuit 110 and predetermined processing is performed.

For example, a chosen type of touch panel can be adopted as the touch panel 40, such as a pressure-sensitive touch panel, an electrostatic touch panel, an optical touch panel or the like. The pressure-sensitive touch panel detects changes in pressure when the panel is pressed by the operating body. The electrostatic touch panel detects electrical signals from static electricity caused by the operating body touching the panel. In a general type of optical touch panel, an optical sensor provided in the outer framework of the display panel detects the position and movement direction of the operating body that touches the panel. Further, as another type of optical sensor, there is an in-cell optical touch panel. In the in-cell optical touch panel, an optical sensor array is mounted in the display panel and the optical sensor array detects the position and movement trajectory of the operating body that touches or approaches the display panel.

A contact-type touch panel that detects the touch of the operating body (for example, the above-described pressure-sensitive touch panel and electrostatic touch panel) is generally used as the touch panel 40. The user presses on the surface of (namely taps) the touch panel 40 with his/her finger or a stylus etc., and can perform various operations on the imaging device 10 by moving the finger or stylus that is pressing the touch panel 40.

Note that non-contact touch panels are also available that detect the approach of the operating body even if the operating body does not touch the touch panel. The non-contact touch panel is, for example, the above-described optical touch panel. Hereinafter, for ease of explanation, examples are explained in which the contact-type touch panel 40 detects the position touched by the operating body (a finger, for example), but the position detecting portion of the present invention is not limited to this example, and can be a non-contact touch panel or another type of screen position detecting device.

The control circuit 110 functions as a control portion 230 (refer to FIG. 4) that controls each portion of the imaging device 10. The control circuit 110 is, for example, a central processing unit (CPU), an electrically erasable programmable read-only memory (EEPROM), a read-only memory (ROM), a random access memory (RAM) or the like. The ROM of the control circuit 110 stores a program to execute various control processes of the control circuit 110. The CPU operates based on the program, and, using the RAM, performs numerical calculations and control processing to perform each of the above-described control processes. The program can be stored in advance in a storage device (for example, the ROM) built into the imaging device 10. Alternatively, the program may be stored in a removable recording medium and supplied to the imaging device 10, or may be downloaded to the imaging device 10 via a network such as a LAN, the Internet and so on.

Examples of controls of the control circuit 110 will be described. The control circuit 110 switches a power source of the imaging device 10 on and off, based on operation of the power source switch 30A by the user.

In addition, by transmitting an instruction to the image data processing portion 102 and the recording/playback circuit 108 based on user operation of the still image pickup button 30B, the control circuit 110 causes still image data to be recorded on the disk-shaped recording medium 2 by supplying the still image data supplied from the image data processing portion 102 to the recording/playback mechanism 112 via the recording/playback circuit 108. In this way, the still image pickup button 30B functions as a so-called shutter button to pickup and record still images.

Further, by transmitting an instruction to the zoom drive portion 120 based on operation of the zoom switch 30C by the user, the control circuit 110 causes a movable lens (not shown in the figures) of the image pickup optical system 14 to move, and thus changes a zoom ratio of the image pickup optical system 14.

Additionally, by transmitting an instruction to the image data processing portion 102 based on operation of the mode switchover switch 30D, the control circuit 110 switches between a moving image pickup mode in which the image data processing portion 102 generates moving image data and a still image pickup mode in which the image data processing portion 102 generates still image data. Note that, in the moving image pickup mode, the moving image data generated by the image data processing portion 102 is recorded onto the disk-shaped recording medium 2 or the memory card 4 via the recording/playback circuit 108, and in the still image pickup mode, the still image data generated by the image data processing portion 102 is recorded onto the disk-shaped recording medium 2 or the memory card 4 via the recording/playback circuit 108. Note also that, in addition to the above-described two pickup modes, the control circuit 110 can switch to a playback mode to playback the recorded images.

Additionally, based on a first operation by the user of the moving image pickup button 30E, the control circuit 110 starts and stops recording of the moving image data by the imaging device 10. In other words, by transmitting an instruction to the image data processing portion 102 and the recording/playback circuit 108 based on the user operation of the moving image pickup button 30E (recording start instruction), the control circuit 110 causes an operation to start (image recording start) in which moving image data is recorded onto the disk-shaped recording medium 2 by supplying the moving image data supplied from the image data processing portion 102 to the recording/playback mechanism 112 via the recording/playback circuit 108. In addition, based on a second operation by the user of the moving image pickup button 30E (recording stop instruction), the control circuit 110 stops the above-described recording operation (image recording end). In this way, the moving image pickup button 30E functions as an operating member (recording start/stop operating portion) that is used by the user to instruct the imaging device 10 to start or stop recording the moving images. Note that, in the imaging device 10 according to the present embodiment, the recording start operating portion and the recording stop operating portion are the same operating member (the moving image pickup button 30E) but both portions may be formed as separate operating members.

Furthermore, during a recording period from the instruction to start recording to the instruction to stop recording, based on user operation of the index button 30F (index instruction), the control circuit 110 generates index information relating to the moving image data being recorded, and records the index information such that it is associated with the corresponding moving image data. The index button 30F functions as an operating member (index operating portion) used by the user to input the index instruction.

The index information is time information that shows a time point specified by the user during the recording period. For example, while the moving images are being picked up, the user depresses the index button 30F at an exciting scene during image pickup (a scene of a homerun in baseball, for example) or at a scene that the user likes (a scene of a child's smiling face, for example). By doing this, an index (bookmark) can be attached to a chosen time point of the moving images being recorded, and a specific scene specified by the user during image pickup can be distinguished as a special scene. This type of index information generated during pickup of the moving images is useful as an index when moving images are played back or edited at a later time.

The positioning portion 122 has functions to measure a current position of the imaging device 10 and generate position information indicating the current position. The positioning portion 122 is formed, for example, of a global positioning system (GPS) sensor, an angular rate sensor, an acceleration sensor, a magnetic sensor or the like. By using these various types of sensor to measure the current position (latitude and longitude etc.) and an orientation etc. of the imaging device 10 when picking up the moving images, the positioning portion 122 generates the position information indicating a image pickup position of the moving images.

For example, the GPS sensor receives radio waves from a plurality of GPS satellites and, by calculating a distance from each of the GPS satellites, it measures the current position (latitude and longitude) of the imaging device 10. The angular rate sensor and the acceleration sensor detect, respectively, the angular rate and the acceleration when the imaging device 10 moves during image pickup. By detecting a magnetic field surrounding the imaging device 10, the magnetic sensor detects the orientation of the imaging device 10. By analyzing these measurement data (the current position, angular rate, acceleration of the imaging device 10, changes in terrestrial magnetism), the positioning portion 122 calculates the position of the imaging device 10 during pickup of the moving images (namely, the image pickup position) and generates the position information indicating the calculated image pickup position.

By control of the recording/playback circuit 108 etc., the control circuit 110 records the position information generated by the above-described positioning portion 122 onto the recording medium, such that the position information is associated with the recorded moving image data. For example, the position information is generated at a predetermined time interval (every few seconds, every few minutes, for example) during the recording period, and is recorded in a memory (not shown in the figures) such that it is associated with image pickup time information (information indicating a time period from a beginning of the moving images, a time code or an image pickup time, for example) of the moving images being recorded. Additionally, the position information may be incorporated into data of the moving images being recorded.

Further, by controlling the above-described recording/playback mechanism 112, the recording/playback circuit 108 and the drive circuit 114 etc., the control circuit 110 generates, during the recording period, a plurality of thumbnail images from the picked up moving images, and causes a recorded image verification screen to be displayed on the display panel 20 immediately after pickup of the moving images (namely, immediately after the recording stop instruction). The recorded image verification screen is an auto review screen (Rec_Review screen) that is used to check content of the recorded moving images immediately after the recording of the moving images ends, and this will be explained in more detail later.

Functional Structure of Imaging Device

Figure 4:
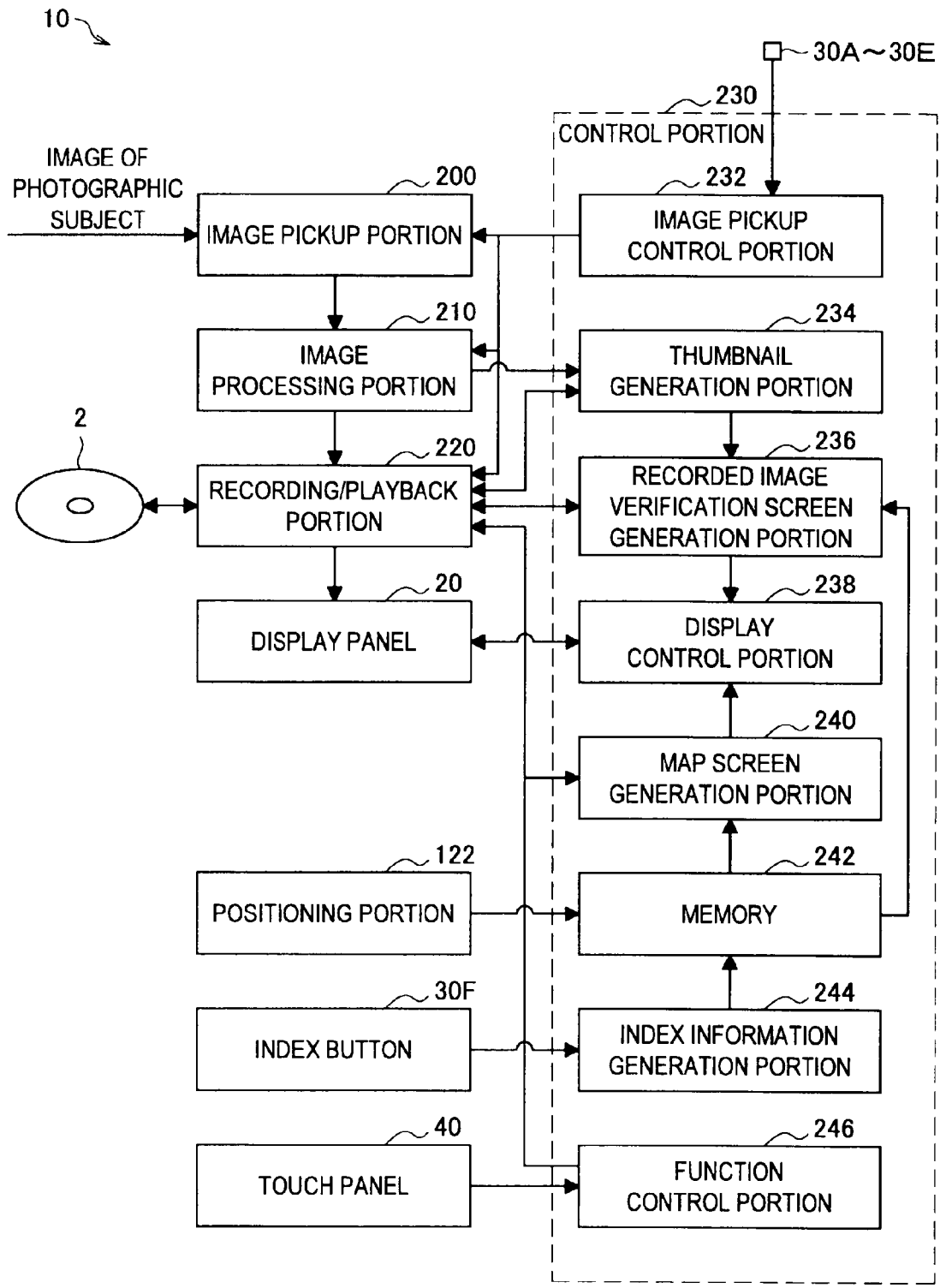
FIG. 4 is a block diagram showing a functional structure of the imaging device according to the first embodiment.

Next, a functional structure of the imaging device 10 according to the present embodiment will be explained with reference to FIG. 4. FIG. 4 is a block diagram showing the functional structure of the imaging device 10 according to the present embodiment.

As shown in FIG. 4, the imaging device 10 includes the image pickup portion 200, the image processing portion 210, the recording/playback portion 220, the control portion 230, the display panel 20, the various operating portions 30A to 30F, the touch panel 40 that is the separate operating portion and the positioning portion 122. The control portion 230 includes an image pickup control portion 232, a thumbnail generation portion 234, a recorded image verification screen generation portion 236, a display control portion 238, a map screen generation portion 240, a memory 242 that is a memory portion, an index information generation portion 244 and a function control portion 246. Hereinafter, each functional portion of the imaging device 10 will be described.

The image pickup portion 200 includes, for example, the image pickup optical system 14, the lens barrel 16, the image pickup element 18 and drive circuits such as the zoom drive portion 120 etc. shown in FIG. 3. In accordance with control by the image pickup control portion 232, the image pickup portion 200 picks up an optical image of a photographic subject using the image pickup element 18, and outputs an image pickup signal representing the images obtained by the image pickup.

The image processing portion 210 includes, for example, the video image amplifier circuit 100 and the image data processing portion 102 etc. shown in FIG. 3. In accordance with control by the image pickup control portion 232, the image processing portion 210 generates moving images from a plurality of image data by executing predetermined signal processing on the image pickup signal. The moving images are formed of moving image frames continuously generated at a predetermined time period interval (1/60 second, for example).

The recording/playback portion 220 is formed of, for example, the recording/playback circuit 108 and the recording/playback mechanism 112 shown in FIG. 3, and records a variety of data onto the disk-shaped recording medium 2 and plays back a variety of data from the disk-shaped recording medium 2. For example, in accordance with control by the image pickup control portion 232, the recording/playback portion 220 records moving images input from the image processing portion 210 onto the disk-shaped recording medium 2, and also plays back moving images recorded on the disk-shaped recording medium 2. In addition, the recording/playback portion 220 records onto the disk-shaped recording medium 2 thumbnail images that are generated by the thumbnail generation portion 234, which will be explained later. The recording/playback portion 220 further plays back the thumbnail images recorded on the disk-shaped recording medium 2.

The control portion 230 is formed of, for example, the control circuit 110 shown in FIG. 3, and controls all the portions of the imaging device 10. A processor of the control circuit 110 realizes all the functional portions shown in FIG. 4, by executing a computer program that realizes each of the functions to be explained hereinafter.

The image pickup control portion 232 controls an image pickup operation of the imaging device 10. In other words, in accordance with user operation of the various operating portions 30A to 30E, the image pickup control portion 232 controls the image pickup portion 200, the image processing portion 210 and the recording/playback portion 220 in the manner described above, thus causing pickup processing and recording/playback processing of the moving images or still images. For example, when the user presses the moving image pickup button 30E, and thus inputs the instruction to start recording, the image pickup control portion 232 controls the recording/playback portion 220 and starts recording (recording start operation) of the moving images generated by the image pickup portion 200 and the image processing portion 210 onto the disk-shaped recording medium 2. On the other hand, when the user once more presses the moving image pickup button 30E, and thus inputs the instruction to stop recording, the image pickup control portion 232 controls the recording/playback portion 220 and stops recording (recording stop operation) of the moving images.

Note that, the image pickup control portion 232 can switch the operating mode of the imaging device 10 between the moving image pickup mode, the still image pickup mode and the playback mode etc., based on user operation of the mode switchover switch 30D. In the moving image pickup mode and the still image pickup mode, the image pickup processing by the image pickup portion 200 and image processing by the image processing portion 210 is continually performed, and the moving images during image pickup that are obtained by this processing are displayed on the display panel 20 as a live view screen. While watching the live view screen, the user decides a composition of the photographic subject and a shutter chance, and inputs to the imaging device 10 an instruction to record moving images or a still image. In the moving image pickup mode, the moving image data that are picked up and on which image processing is performed during the recording period from the recording start instruction to the recording stop instruction made using the above-described moving image pickup button 30E are recorded onto the disk-shaped recording medium 2. In the still image pickup mode, in correspondence to a release instruction when the user presses the still image pickup button 30B (a so-called shutter button), the still image data that is pickup up at the timing of the release instruction and on which image processing is performed are recorded on to the disk-shaped recording medium 2.

The thumbnail generation portion 234 time divides moving images recorded during the recording period from the recording start instruction to the recording stop instruction made by the user into a plurality of sections, and respectively generates thumbnail images representing each section of the moving images. The thumbnail images are still images extracted from the moving images recorded during the recording period. The sections are image sections that are set by time division and have a predetermined time length. The plurality of thumbnail images that represent, respectively, the plurality of sections generated by time division of the moving images are displayed in chronological order on the recorded image verification screen, which will be explained later.

More specifically, the thumbnail generation portion 234 generates the thumbnail image for each section of the moving images by respectively extracting a single frame image from each of the time divided moving image sections. For example, when the moving images of a ten minute recording period are uniformly time divided into ten sections, the time length of each of the sections is one minute, and ten thumbnail images are generated. The thumbnail generation portion 234 may time divide all the moving images constantly into a predetermined number (a fixed number) of sections, and generate a predetermined number of thumbnail images. Alternatively, the thumbnail generation portion 234 may fix the time length of the section and generate a chosen number of thumbnail images by changing the number of sections for each of the moving images. In the following explanation, an example is described in which the thumbnail generation portion 234 time divides the moving images into a predetermined number of sections (nine sections, for example) and generates thumbnail images representing each of the sections.

Here, a timing at which the thumbnail generation portion 234 generates the plurality of thumbnail images will be explained. The generation of the thumbnail images may be performed during the recording period of the moving images (during pickup of the moving images) or may be performed immediately after the recording period is ended.

In a case in which the thumbnail images are generated during the recording period, the thumbnail generation portion 234 generates the thumbnail images by extracting frames at a chosen time interval from the moving images output from the image processing portion 210. The thumbnail generation portion 234 then records the thumbnail images and also image pickup time information (information indicating a time period from the start of moving image pickup, a time code or an image pickup time, for example) of the thumbnail images onto the disk-shaped recording medium 2 or a memory (not shown in the figures) via the recording/playback portion 220. At that time, the thumbnail images and the image pickup time information may be saved, for example, as a database file (an AV index file etc.). In this case, during the recording period, a final recording time is not known, and therefore the thumbnail generation portion 234 generates the plurality of thumbnail images at a predetermined time interval.

After that, when the user presses the moving image pickup button 30E and thus inputs the recording stop instruction, the thumbnail generation portion 234 time divides the moving images recorded during the recording period into the predetermined number of sections (nine sections, for example) that has been set in advance, and extracts one of the thumbnail images from the plurality of thumbnail images belonging to each section. For example, the thumbnail generation portion 234 divides the time length of the recorded moving images (namely, the recording time) into nine equal sections, and extracts, respectively, thumbnail images generated at times closest to each of the nine equally divided time sections. In this way, nine thumbnail images are extracted that represent, respectively, each of the sections in which the moving images are uniformly divided into nine. The nine thumbnail images are displayed on the recorded image verification screen.

On the other hand, when the thumbnail images are generated immediately after the recording period is ended, when the user presses the moving image pickup button 30E and thus inputs the recording stop instruction, the thumbnail generation portion 234 reads out the moving images recorded on the disk-shaped recording medium 2, and time divides the read out moving images into the predetermined number of sections (nine sections, for example). The thumbnail generation portion 234 decodes, respectively, the images at a chosen time point (a start point, an end point, a middle point etc.) within each of the sections, generates the predetermined number of thumbnail images and stores them in a memory (not shown in the figures).

The recorded image verification screen generation portion 236 generates the recorded image verification screen on which the thumbnail images of the recorded moving images are arranged in chronological order. The recorded image verification screen is an auto review screen that is automatically displayed on the display panel 20 of the imaging device 10 immediately after recording of the moving images ends (namely, immediately after the recording stop instruction is input). The recorded image verification screen is provided with an auto review function that offers the user immediately after recording an overview of the recorded moving images, and is also provided with image operating functions that execute predetermined functions (playback, deletion, rating etc.) with respect to the moving images immediately after recording. The recorded image verification screen includes the plurality of thumbnail images generated by the thumbnail generation portion 234 and function icons that are graphic user interface (GUI) parts. The recorded image verification screen will be explained in more detail later (refer to FIG. 5).

The display control portion 238 controls the display panel 20 and displays various images and data. For example, the display control portion 238 causes the recorded image verification screen generated by the recorded image verification screen generation portion 236 to be displayed on the display panel 20. Further, the display control portion 238 causes the map screen generated by the map screen generation portion 240 (to be described later) to be displayed on the display panel 20.

The map screen generation portion 240 generates the map screen representing the image pickup position of the moving images. After the above-described recorded image verification screen has been displayed immediately after recording of the moving images is ended, the map screen is displayed on the display panel 20 of the imaging device 10. The map screen is a screen on which the image pickup position of one or more currently or previously recorded moving images is mapped onto a map, and the map screen will be described in more detail later (refer to FIG. 9).

The positioning portion 122 is formed of the above-described GPS sensor etc., and measures the current position of the imaging device 10. The positioning portion 122 generates, at least during the recording period of the moving images, the position information indicating the current position of the imaging device 10 (latitude and longitude, for example) and the movement trajectory. The position information is stored in the memory 242 such that it is associated with the moving images recorded during the recording period. The map screen generation portion 240 reads out the above-described position information from the memory 242 and generates the map screen based on the position information. The map screen is displayed on the display panel 20 by the display control portion 238 after display of the above-described recorded image verification screen.

During the recording period, the index information generation portion 244 generates index information representing a time point at which the user uses the index button 30F to input an index instruction, and the index information is saved while being associated with the recorded moving images. The above-described index information is time information indicating the time point at which the user inputs the index instruction during the recording period (namely, the time point at which the index button 30F is pressed). The index information functions as an index attached to an exciting scene or a scene that the user likes among the moving images.

During pickup of the moving images (during the recording period), the user presses the index button 30F and inputs the index instruction. In accordance with the input of the index instruction, the index information generation portion 244 generates the index information that includes the time information indicating the time point at which the index instruction is input (for example, a time at which the index button 30F is pressed, or a time period from the beginning of the moving images, a time code etc.). The index information generation portion 244 then saves the generated index information onto the memory 242 such that it is associated with the moving images. By generating the index information in this way, the index can be attached that represents the user's preferred scenes among the recorded moving images.

When generating the thumbnail images displayed on the recorded image verification screen, the thumbnail generation portion 234 may identify, based on the index information saved in the memory 242, frames of the moving images to which the index is attached, and may extract by priority those frames as the thumbnail images. Note that the frames of the moving images to which the index is attached are, among the moving images, frames corresponding to the time points represented by the index information.

For example, when the index is attached to a section of the moving images, the thumbnail generation portion 234 extracts by priority the frame to which the index is attached as the thumbnail image of that section. Furthermore, when a plurality of indices are attached to a single section, the thumbnail generation portion 234 extracts a frame of the moving images to which, from the plurality of indices, a specific index (a first or a last index, for example) is attached. On the other hand, with respect to a section to which no index is attached at all, the thumbnail generation portion 234 may extract a frame of a selected time point within the section (a first frame, a last frame or a middle frame within the section).

Furthermore, the recorded image verification screen generation portion 236 generates the recorded image verification screen in a display format such that the thumbnail images to which no index is attached and the thumbnail images to which the index is attached can be distinguished from one another. In this way, in the present embodiment, of the recorded moving images, the image frames to which the index is attached at the time of image pickup are extracted by priority and are displayed on the recorded image verification screen such that those thumbnail images can be distinguished. In this way, the user can more accurately ascertain content of the moving images while watching the recorded image verification screen.

During display of the recorded image verification screen of the recorded moving images, the function control portion 246 executes predetermined functions with regard to part or all of the moving images, based on the user operation of the touch panel 40. The predetermined functions are selected functions that can be executed on the image data of the moving images, and are, for example, deletion of at least some of the sections of the moving images, attribution of an evaluation value (namely, rating) or playback etc. The function control portion 246 may execute the predetermined functions on all of one of the recorded moving images, or may execute the predetermined functions on some of the sections of the moving images.

For example, during display of the recorded image verification screen, a case can be posited in which a first position on the display screen detected by the touch panel 40 corresponds to a display position of one or more of the thumbnail images among the plurality of thumbnail images displayed on the recorded image verification screen, and a second position on the display screen detected by the touch panel 40 corresponds to a display position of a delete icon, among the plurality of function icons. In this case, the user uses the touch panel 40 to select, among the plurality of thumbnail images, one or more of the thumbnail images and also to select the delete icon. Here, the function control portion 246, among the moving images recorded on the disk-shaped recording medium 2, executes the function corresponding to the delete icon (namely, the delete function) on the section of the image data that corresponds to the thumbnail image selected on the touch panel 40. In other words, among the recorded moving images, the function control portion 246 performs partial deletion of the image data of the above section from the disk-shaped recording medium 2. When the user uses the touch panel 40 in this way to select the chosen thumbnail image and function icon on the recorded image verification screen, functions, such as deletion, rating and playback, can be executed with respect to moving images that have only just been recorded.

Example of display of recorded image verification screen

Figure 5:
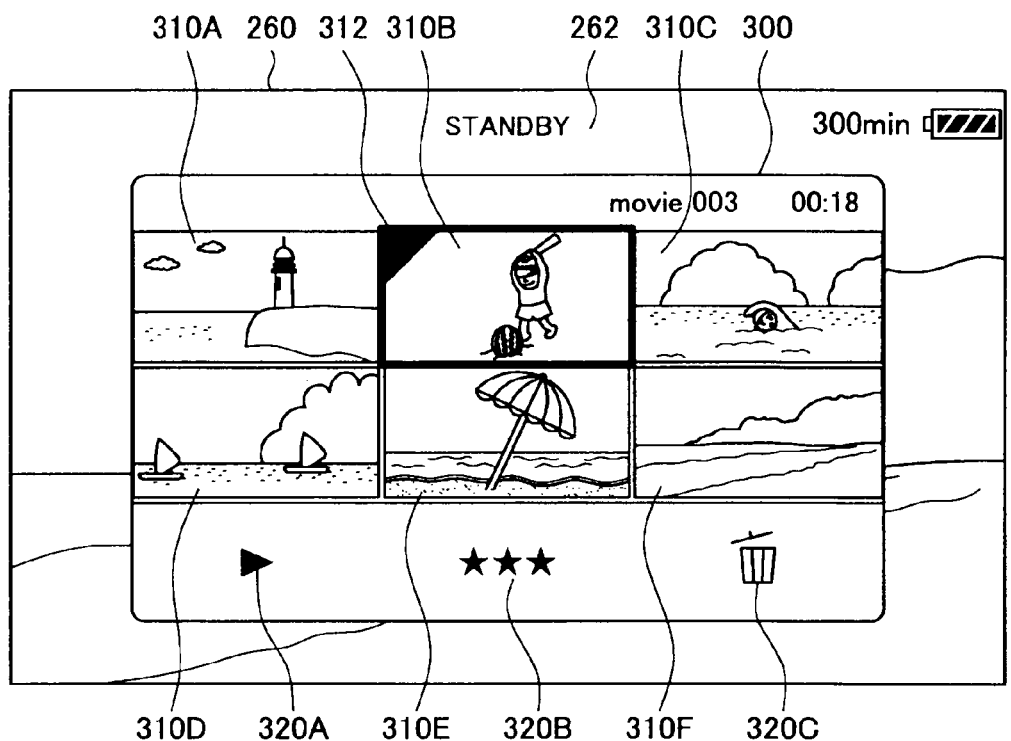
FIG. 5 is a diagram showing a display example of a recorded image verification screen according to the first embodiment.

Next, an example of display on a recorded image verification screen 300 according to the present embodiment will be explained with reference to FIG. 5. FIG. 5 is a diagram showing an example of display on the recorded image verification screen 300 according to the present embodiment.

As shown in FIG. 5, when the moving image pickup button 30E is pressed by the user (namely, the recording stop instruction is input) while moving images are being picked up and recorded by the imaging device 10 during the recording period, namely, when recording of the moving images is ended, the recorded image verification screen 300 is displayed on a display screen 260 of the display panel 20. The recorded image verification screen 300 is, for example, a rectangular window that is a size smaller than the display screen 260, and is overlaid with a recording standby screen 262 that is displayed on the whole of the display screen 260. The recording standby screen 262 is a live view screen that displays images currently being picked up by the imaging device 10, and is displayed by a recording standby mode that waits until the recording start instruction is input by the user. In known general digital video cameras, when moving from a recording mode to the recording standby mode in response to the recording stop instruction, only the recording standby screen 262 is displayed.

With the imaging device 10 according to the present embodiment, immediately after the recording operation is ended in response to pressing the moving image pickup button 30E during the recording period, the recorded image verification screen 300 is displayed, which shows the user the content of the moving images that have just been recorded. The recorded image verification screen 300 is the auto review screen that is automatically displayed on the display panel 20 of the imaging device 10 immediately after recording of the moving images is ended (namely, immediately after the recording stop instruction by pressing the moving image pickup button 30E). In this case, "immediately after the recording stop instruction (immediately after the recording end)" means "immediately after elapse of the required processing time to generate and display the recorded image verification screen 300, from the time point at which the recording stop instruction is input" and it is preferable for the recorded image verification screen 300 to be displayed, for example, within a few seconds (one second, for example) from the time point at which the recording stop instruction is input. As long as there is no user operation of the touch panel 40 to execute the predetermined functions, the recorded image verification screen 300 automatically disappears after a chosen predetermined time period Ts has elapsed from when the recorded image verification screen 300 is automatically displayed immediately after the recording ends, and the recording standby screen 262 is returned. In sum, changes in the screens displayed on the display screen 260 of the display panel 20 around the end of recording are as described below.

(1) During the recording mode (recording period), the live view screen of images being picked up and recorded is displayed.

(2) When the recording stop instruction is input during the recording period, immediately after the recording ends, the recorded image verification screen 300 is automatically displayed, and after elapse of the predetermined time period Ts, the recorded image verification screen 300 is automatically removed.

(3) In the recording standby mode (non recording period), after the recorded image verification screen 300 is removed, the recording standby screen 262, which is the live view screen during image pickup, is displayed.

Hereinafter, the content of the recorded image verification screen 300 will be explained in more detail. The recorded image verification screen 300 includes a plurality of thumbnail images 310 that are extracted from the recorded moving images and function icons 320 that are GUI parts. The recorded image verification screen 300 is provided with both (a) the auto review function that presents the user with content of the recorded moving images immediately after recording and (b) the image operating functions that execute predetermined functions (deletion, rating, playback etc.) on at least part of the moving images immediately after recording. The auto review function is embodied by the plurality of thumbnail images 310 that are arranged on the recorded image verification screen 300 in chronological order. The image operating functions are embodied by the function icons 320 that are displayed along with the thumbnail images 310 on the recorded image verification screen 300.

(a) Auto Review Function

First, the auto review function of the recorded image verification screen 300 will be explained in more detail. The plurality of thumbnail images 310 relating to the recorded moving images are displayed in chronological order on the recorded image verification screen 300. The thumbnail images 310 represent, respectively, the plurality of sections into which the recorded moving images have been time divided. Only a predetermined number K (K=fixed number), which is set in advance, of the thumbnail images 310 are displayed on the recorded image verification screen 300. In the example of the recorded image verification screen 300 shown in FIG. 5, a total number of six of the thumbnail images 310A to 310F are displayed in two rows (upper and lower).

There is a limit to a size of the display screen 260 of the imaging device 10, and therefore, when an excessive number of the thumbnail images 310 are displayed on the single recorded image verification screen 300, each of the individual thumbnail images 310 becomes small and therefore it is difficult for the user to ascertain the content. A method is conceivable in which a large number of the thumbnail images can be displayed while maintaining the size of the thumbnail images by using screen switchover or screen scroll functions etc. However, with this type of method, all of the thumbnail images are not displayed on one screen and a user operation is required to switchover the screen etc. It is therefore not appropriate, because the recorded image verification screen 300 is intended to enable recorded content to be promptly ascertained immediately after recording.

In this case, in order to maintain the size of the thumbnail images 310, and present the user with content of the whole moving images on one screen in an easy to understand manner, it is preferable for the number of the thumbnail images 310 displayed on the recorded image verification screen 300 to be fixed as the predetermined number K that is appropriate to the screen size. As a result, the predetermined number K (which is set in advance) of the thumbnail images 310 are extracted and displayed such that they are contained on the recorded image verification screen 300 in a suitable manner, whatever the recording time of the moving images. Note that, the predetermined number K of the displayed thumbnail images 310 is not limited to the six images of FIG. 5, and may be, for example, nine images of FIG. 8 which will be described later.

In order to display the predetermined number K of the thumbnail images 310 for the single set of moving images in this way, the imaging device 10 time divides the moving images recorded by a single recording operation such that the moving images are divided into the predetermined number K sections (six sections, or nine sections, for example). At this time, by dividing the moving images into sections with uniform lengths of time, the imaging device 10 may set the predetermined number K of sections, and may extract, as the thumbnail images 310, a single frame from each of the uniformly divided sections (the first frame, the last frame or the middle frame of each of the sections, for example).

Alternatively, the imaging device 10 may analyze the content of the moving images and, by recognizing a plurality of scenes that form the moving images and time dividing the moving images by each scene, may set sections corresponding to the predetermined number K of scenes. When using scene recognition, in a case in which scenes exceeding the predetermined number K or scenes fewer than the predetermined number K are recognized, the scenes are combined or divided such that, finally, the predetermined number K of sections are set. From the sections of the moving images set for each scene in this way, a single frame (the first frame, the last frame or the middle frame of each of the sections, for example) can be extracted as the thumbnail images 310.

In addition, the user can use the index button 30F, as described above, to attach an index to exciting scenes etc. during the recording period, and the presence/absence and position of the index can be determined using the index information indicating the time point of the moving images to which the index is attached. When the index is attached to the moving images in this way, when extracting the thumbnail images 310 from each of the sections of the moving images, the imaging device 10 extracts by priority the frame of the moving images to which the index is attached as the thumbnail image 310. On the recorded image verification screen 300, the thumbnail image 310 of the time point to which the index is attached is displayed in a display format such that it can be seen that the index is attached. For example, in the example shown in FIG. 5, the thumbnail image 310B is the thumbnail image of the time point to which the index is attached, and an index mark 312 is attached to the upper left of the thumbnail image 310B in a noticeable color (pink, for example).

The predetermined number K of the thumbnail images 310 that are extracted from the recorded moving images in the above-described manner are arranged in chronological order within the single screen of the recorded image verification screen 300, as shown in FIG. 5. In the example shown in FIG. 5, the six thumbnail images 310A to 310F are arranged in chronological order from the top left to the bottom right. Namely, they are arranged in the order 310A→310B→310C→310D→310E→310F. The six thumbnail images 310A to 310F represent, respectively, the six sections into which the recorded moving images have been divided by time division, and reflect the overall composition of the moving images. By looking at the thumbnail images 310A to 310F in the chronological order in which they are arranged, the user can ascertain transitions in the scenes of the moving images recorded in a single recording operation.

In the above-described manner, the imaging device 10 according to the present embodiment displays the recorded image verification screen 300, on which the above-described thumbnail images 310A to 310F are arranged in chronological order, on the display screen 260 immediately after the recording ends. By doing this, the overall composition of the recorded moving images can be presented in an easy to understand manner to the user immediately after image pickup and recording of the moving images while the user's memory is still fresh. As a consequence, the user can ascertain the content of the moving images easily and appropriately, and can easily determine whether or not to delete the moving images, whether or not the moving images require editing and so on. Furthermore, the thumbnail image 310B of the time point to which the user attached the index during the recording period is also displayed, and the user can thus more appropriately ascertain recorded content of exciting scenes etc.

In addition, when the plurality of thumbnail images 310 are displayed on the recorded image verification screen 300 immediately after the end of recording, the plurality of thumbnail images 310 are displayed one by one in reverse chronological order. In the example shown in FIG. 5, the thumbnail images 310A to 310F are displayed sequentially in the order 310F→310E→310D→310C→310B→310A. In this way, the thumbnail images 310 are displayed in order from the thumbnail image 310 of the section that is closest, in time terms, to the time point at which the recording stop instruction is input, and can thus be displayed in reverse time order. Therefore, on the recorded image verification screen 300, the user can look at the thumbnail images 310 in order from the scene that is even fresher in the user's mind, and the recorded content is even easier to ascertain. Note that, the display order of the thumbnail images 310 on the recorded image verification screen 300 is not limited to the above-described reverse order of the chronological order, and the plurality of thumbnail images 310 may be, for example, displayed one by one in chronological order, or all the thumbnail images 310 may be displayed simultaneously.

(b) Image Operating Functions

Next, image operating functions of the recorded image verification screen 300 will be explained in more detail. The plurality of function icons 320 are also displayed on the recorded image verification screen 300, in addition to the above-described thumbnail images 310. The function icons 320 are GUI parts that serve to execute predetermined functions (playback, rating, deletion etc.) on the recorded moving images. In the example shown in FIG. 5, as the three function icons 320, the playback icon 320A, the rating icon 320B and the delete icon 320C are displayed on a lower portion of the recorded image verification screen 300.

The playback icon 320A is a function icon that executes a function (playback function) that plays back at least part of the moving images recorded on the disk-shaped recording medium 2. The rating icon 320B is a function icon that executes a function (rating function) that attributes an evaluation value (a five-level evaluation value, for example) to at least some of the sections of the moving images recorded on the disk-shaped recording medium 2. The delete icon 320C is a function icon that executes a function (delete function) that deletes at lease some of the sections of the moving images recorded on the disk-shaped recording medium 2.

By specifying the above-described function icons 320 on the recorded image verification screen 300, the user can execute, on the recorded moving images, the function corresponding to the selected function icon 320. In the manner described above, the touch panel 40 is provided on the display panel 20 of the imaging device 10, and the touch panel 40 detects the position (screen position) specified by the user on the display screen. The user operation on the display panel 20, such as the selection of the thumbnail images 310 or the selection of the function icons 320 by the user, can be detected by the touch panel 40.

During display of the recorded image verification screen 300, the imaging device 10 detects the presence or absence of the user operation by the touch panel 40. As a result, when the position detected by the touch panel 40 during display of the recorded image verification screen 300 corresponds to the display position of one of the function icons 320, it can be said that the user has selected the corresponding function icon 320. In this case, the imaging device 10 determines that an instruction to execute the function corresponding to this function icon 320 has been input, and executes the function corresponding to this function icon 320 on at least some of the sections of the recorded moving images.

For example, during display of the recorded image verification screen 300, if the user touches the delete icon 320C, the imaging device 10 deletes the moving images recorded on the disk-shaped recording medium 2. In this case, the moving images may be deleted directly by the selection by the user of the delete icon 320C, or a confirmation dialog box (not shown in the figures) may be displayed to confirm whether or not to perform deletion and the moving images may be deleted after confirmation by the user. Further, as a method to delete the moving images, for example, in addition to a method to completely delete the data of the moving images recorded on the disk-shaped recording medium 2, there is also a method in which the data of the moving images are moved to a delete list and the moved data are deleted after holding them for a predetermined period of time, or a method in which the data of the moving images are actually saved but the data are not shown to the user and so on.

In addition, during display of the recorded image verification screen 300, if the user touches the playback icon 320A, the imaging device 10 plays back the moving images recorded on the disk-shaped recording medium 2 from the beginning, for example, and displays the moving images on the display panel 20. Further, if the user taps the thumbnail image 310, the imaging device 10 may start playback of the moving images from the position corresponding to that thumbnail image 310, or from the beginning of the section corresponding to that thumbnail image 310.

Additionally, during display of the recorded image verification screen 300, if the user touches the rating icon 320B, the imaging device 10 attributes the evaluation value specified by the user to the moving images recorded on the disk-shaped recording medium 2. For example, when the user selects the rating icon 320B, the imaging device 10 may display an input screen (not shown in the figures) to input the evaluation value, and the evaluation value specified on the input screen may be attributed to the moving images. Information of the input evaluation value is stored in a memory etc. in association with the moving images. The evaluation value can be attributed in multiple stages, for example, from level one to level five.

Examples of executing the predetermined functions (deletion, playback, rating etc.) on the whole of the recorded moving images are described above, but the predetermined functions can be executed partially on some sections of the recorded moving images.

Figure 6:
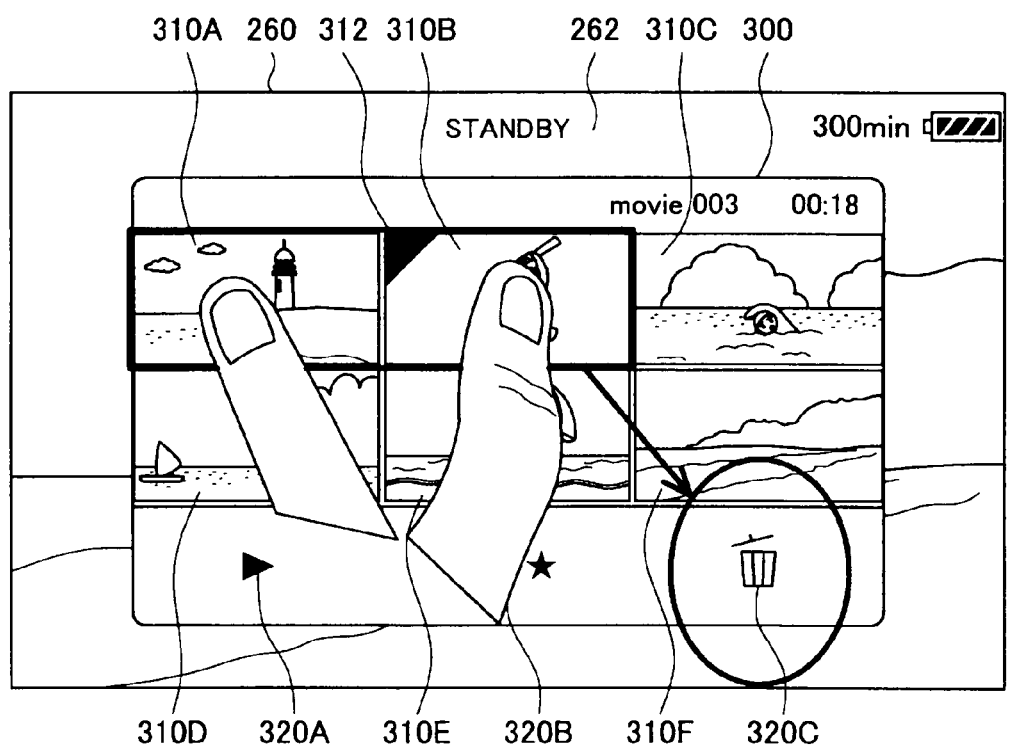
FIG. 6 is a diagram showing user operation when a section that is part of moving images is deleted using the recorded image verification screen according to the first embodiment.

FIG. 6 is a diagram showing a user operation when, on the recorded image verification screen 300 according to the present embodiment, some of the sections of the moving images corresponding to the thumbnail image 310 specified by the user are deleted.

As shown in FIG. 6, among the six thumbnail images 310A to 310F displayed on the recorded image verification screen 300, the user uses two fingers to tap the first two thumbnail images 310A and 310B, drags them to the delete icon 320C and drops them. In response to this user operation, the imaging device 10 performs partial deletion of the sections of the moving images corresponding to the two thumbnail images 310A and 310B specified by the user.

A process to perform this type of partial deletion of the moving images will be explained in more detail. When a position (a first position) detected by the touch panel 40 during display of the recorded image verification screen 300 corresponds to the display position of the two thumbnail images 310A and 310B among the plurality of thumbnail images 310A to 310F, it can be said that the user has selected the sections of the moving images that correspond to the two thumbnail images 310A and 310B. After that, when the drag and drop operation is performed by the user on the thumbnail images 310A and 310B, when a position (a second position) detected by the touch panel 40 corresponds to display position of the delete icon 320C among the plurality of function icons 320A to 320C, it can be said that the user has selected the delete icon 320C. In this case, the imaging device 10 determines that an instruction to execute the delete function corresponding to the delete icon 320C on the sections of the moving images corresponding to the two thumbnail images 310A and 310B has been input, and thus performs partial deletion of those sections of the moving images. In this partial delete function, the section of the moving image corresponding to the thumbnail image 310A and the section of the moving images corresponding to thumbnail image 310B may be deleted, or the moving images from the frame corresponding to the thumbnail image 310A to the frame corresponding to the thumbnail image 310B may be deleted.

A case of partial deletion of the moving images is explained above, but another predetermined function can be executed in a similar manner in a case in which some of the sections of the moving images are played back, or a case in which an evaluation value is attributed to some of the sections of the moving images. In a case of partial playback, the imaging device 10 partially plays back the sections of the moving images corresponding to one or more of the thumbnail images 310 specified by the user. Further, in a case of partial rating, the imaging device 10 partially attributes the evaluation value to the sections of the moving images corresponding to one or more of the thumbnail images 310 specified by the user.

In addition, when the index is attached to the thumbnail image 310, using the index mark 312 on the recorded image verification screen 300 as a guide, the user perform operations on the above-described moving images.

The image operating functions on the recorded image verification screen 300 are explained above, with reference to FIG. 5 and FIG. 6. According to the image operating functions of the recorded image verification screen 300 according to the present embodiment, the user can play back, delete or attribute a rating to part or all of the moving images while the user's memory is still fresh immediately after recording the moving images. Moreover, the operations and editing on the moving images can be realized by the easily performed user operation of selecting the thumbnail images 310 and the function icons 320 using the touch panel 40.

In known imaging devices, when sorting or editing recorded moving images at a later stage, it is necessary to play back the moving images and verify the content, which is an extremely complicated and inefficient operation. In contrast, with the recorded image verification screen 300 according to the present embodiment, editing, such as deleting unwanted sections of the moving images, can be performed while the user's memory is still fresh, and thus the editing operation is simple and extremely convenient. Furthermore, if a rating is attributed to some sections of the moving images on the recorded image verification screen 300 immediately after recording, this is also convenient when playing back and viewing or editing the moving images at a later time.

For example, when a father captures images of a child with the imaging device 10, generally, the child moves around without looking at the imaging device 10, and even if the father thinks the child is about to turn around, the child in fact often does not turn around. It is therefore common for a case to occur in which a parent spends a long time picking up images of the child without any chance to take a picture when the child has turned around. Due to this, data of the recorded moving images include many data where unwanted scenes are picked up. In this case, even if, as in known art, a plurality of thumbnail images are simply extracted from the moving images and displayed, similar images of the child are arranged side by side, and thus, when performing editing at a later time, it is complicated to search for which sections of the moving images can be deleted. With respect to this, in the imaging device 10 according to the present embodiment, it is possible to edit the moving images on the recorded image verification screen 300 immediately after recording while still fresh in the photographer's mind, and thus the editing operation can be performed easily and efficiently.

Flow of Display of Recorded Image Verification Screen

Figure 7:
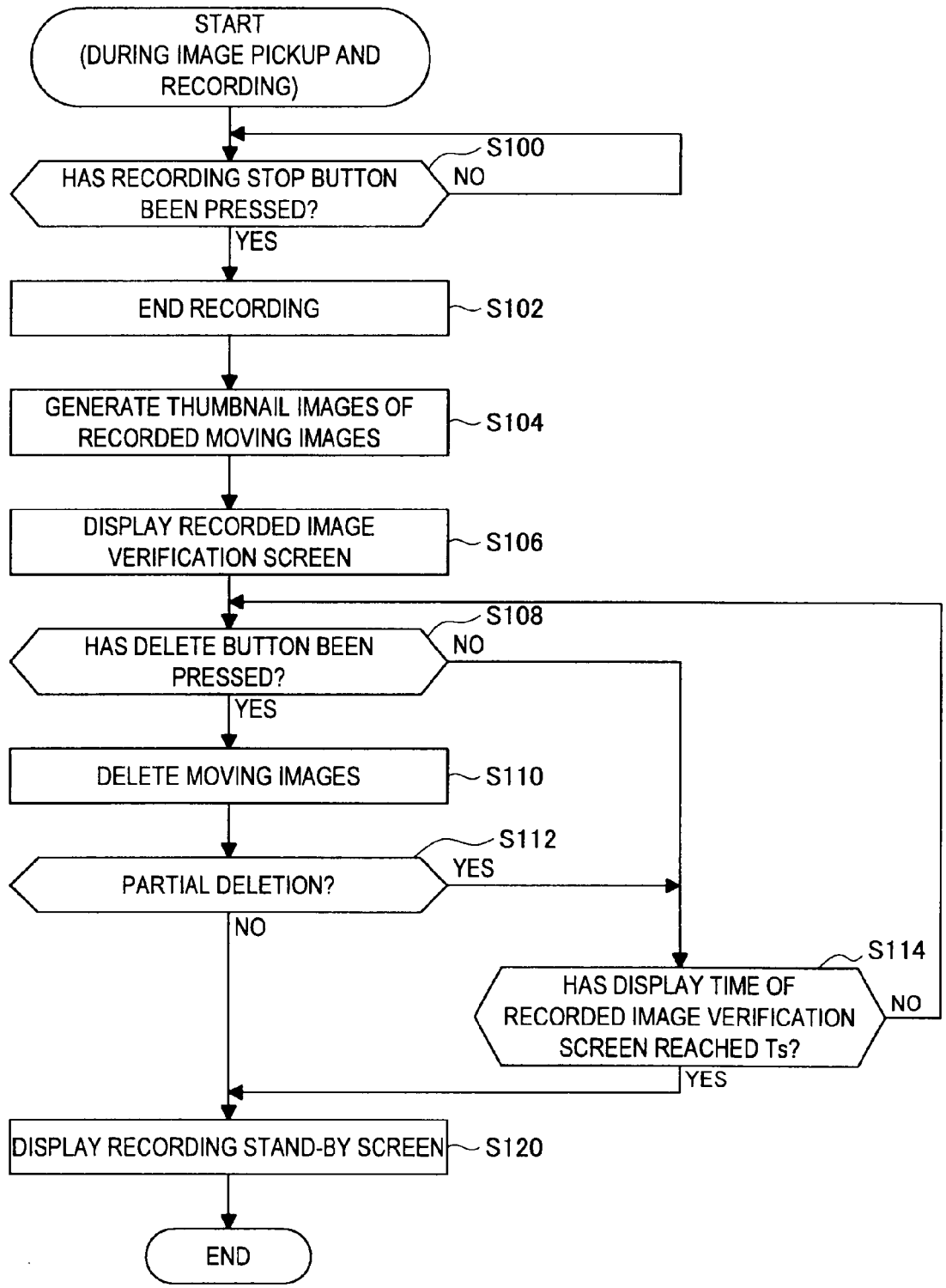
FIG. 7 is a flow chart showing a processing method at an end of recording by the imaging device according to the first embodiment.

Next, with the imaging device 10 according to the present embodiment, a process flow around the end of recording, including a process of display of the recorded image verification screen 300 will be explained with reference to FIG. 7. FIG. 7 is a flow chart showing a processing method at the end of recording by the imaging device 10 according to the present embodiment. Note that FIG. 7 shows a process flow in a case in which the delete function is executed using the delete icon 320C of the recorded image verification screen 300 illustrated in FIG. 5.

As shown in FIG. 7, during the recording period from the recording start instruction to the recording stop instruction, the imaging device 10 picks up images of the photographic subject and also records the images obtained by the image pickup onto the disk-shaped recording medium 2. During the recording period, the imaging device 10 detects whether or not the recording stop instruction has been input by the user. Namely, the imaging device 10 detects whether or not the recording stop button (namely, the moving image pickup button 30E) has been pressed (step S100).

When the recording stop button has been pressed, the imaging device 10 ends the pickup and storing (recording operation) of the moving images (step S102) and also generates the predetermined number K of the thumbnail images 310 relating to the moving images that have finished being recorded (step S104).

The method to generate the predetermined number K of the thumbnail images 310 at step S104 will be explained in more detail. For example, the imaging device 10 may generate many thumbnail images at a certain time interval during the recording period and save the generated thumbnail images to a database. Then, when recording is ended, from the many thumbnail images, the imaging device 10 may extract one by one the thumbnail images 310 of each of the sections obtained by time dividing the recorded moving images into the predetermined number K. At that time, from the many thumbnail images, the thumbnail image that is generated at a time closest to each time at which the recording time of the moving images is time divided into the predetermined number K may be extracted as the thumbnail image 310 for each section. Further, as an alternative method, after recording is ended, the imaging device 10 may decode the frame of the moving images at each time point at which the recording time is time divided into the predetermined number K, and may obtain the predetermined number K of the thumbnail images 310. In addition, with regard to the section of the moving images to which the index is attached, the imaging device 10 may decode the frame at the time point at which the index is attached, and extract by priority the image of that frame as the thumbnail image 310 for that section.

Next, the imaging device 10 displays the recorded image verification screen 300 on the display panel 20 (step S106). The predetermined number K of the thumbnail images 310 generated at step S104 are arranged in chronological order on the recorded image verification screen 300, and the recorded image verification screen 300 further includes the function icons 320. As described above, the recorded image verification screen 300 is displayed immediately after the recording stop instruction is input at step S100 (namely, immediately after the recording stop button is pressed). As long as the image operating function (step S108) using the function icon 320 is not executed, the recorded image verification screen 300 is displayed for the predetermined period of time Ts (step S114) and after Ts has elapsed, the recorded image verification screen 300 is automatically removed and the recording standby screen 262 is displayed (step S120).

After display of the recorded image verification screen 300, until the predetermined period of time Ts elapses, the imaging device 10 detects whether or not the function icon 320 (the delete icon 320C, for example) on the recorded image verification screen 300 is operated by the user (step S108). As a result, if the delete icon 320C is pressed, the imaging device 10 deletes all or part of the recorded moving images (step S110). As shown in FIG. 5, when the delete icon 320C on the recorded image verification screen 300 is touched, all of the moving images are deleted. On the other hand, as shown in FIG. 6, when some of the thumbnail images 310, namely, the thumbnail images 310A and 310B, are selected, and the delete icon 320C is operated, only the sections of the moving images corresponding to the selected thumbnail images 310A and 310B are partially deleted.

After that, if all of the moving images are deleted at step S110 (step S112), the imaging device 10 removes the recorded image verification screen 300 and displays the recording standby screen 262 (step S120). On the other hand, if only part of the moving images are deleted at step S110 (step S112), the imaging device 10 continues to display the recorded image verification screen 300 until the display time reaches the predetermined period of time Ts (step S114). After Ts elapses, the recorded image verification screen 300 is automatically removed and the recording standby screen 262 is displayed (step S120). The recording standby screen 262 is the live view screen during the image pickup by the imaging device 10, and is displayed in the recording standby mode in which image pickup is performed but recording is not performed by the imaging device 10. In the recording standby mode, if the recording start instruction is input (the recording start button is pressed) by the user, the imaging device 10 moves from the recording standby mode to the recording mode, and starts to record the picked up moving images onto the disk-shaped recording medium 2.

Above, the process flow around the end of recording is explained with reference to FIG. 7. Note that, in FIG. 7, the flow is illustrated in the case in which the delete function is executed, but the other predetermined functions apart from the delete function, such as the playback function and the rating function, are executed in a similar manner. However, with the rating function, for example, after the evaluation value is attributed to the moving images (this corresponds to step S110), the imaging device 10 need not necessarily move to the recording standby screen 262 (this corresponds to step S120), but may return to the recorded image verification screen 300 (this corresponds to step S110 to step S114). Furthermore, with the playback function also, after the selected section of the moving images is played back (this corresponds to step S110), the imaging device 10 need not necessarily move to the recording standby screen 262 (this corresponds to step S120), but may return to the recorded image verification screen 300 (this corresponds to step S110 to step S114).

2. Second Embodiment

Next, a second embodiment of the present invention will be described. Immediately after the recording of the moving images, in addition to the recorded image verification screen 300 according to the first embodiment described above, the imaging device 10 according to the second embodiment displays a map screen 400. Note that, in the second embodiment, in comparison with the first embodiment, the point of difference is the display of the map screen 400, and the rest of the functional structure is substantially the same as in the first embodiment. A detailed explanation is thus omitted here.

Figure 8:
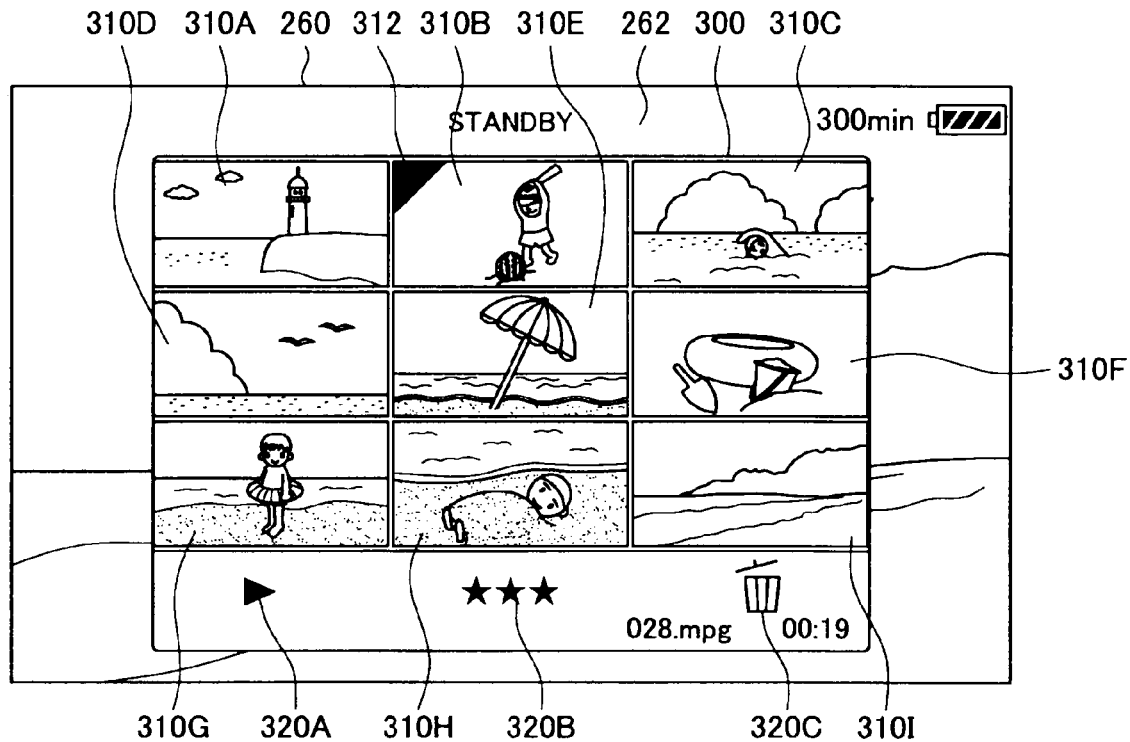
FIG. 8 is a diagram showing a display example of the recorded image verification screen according to a second embodiment of the present invention.
Figure 9:
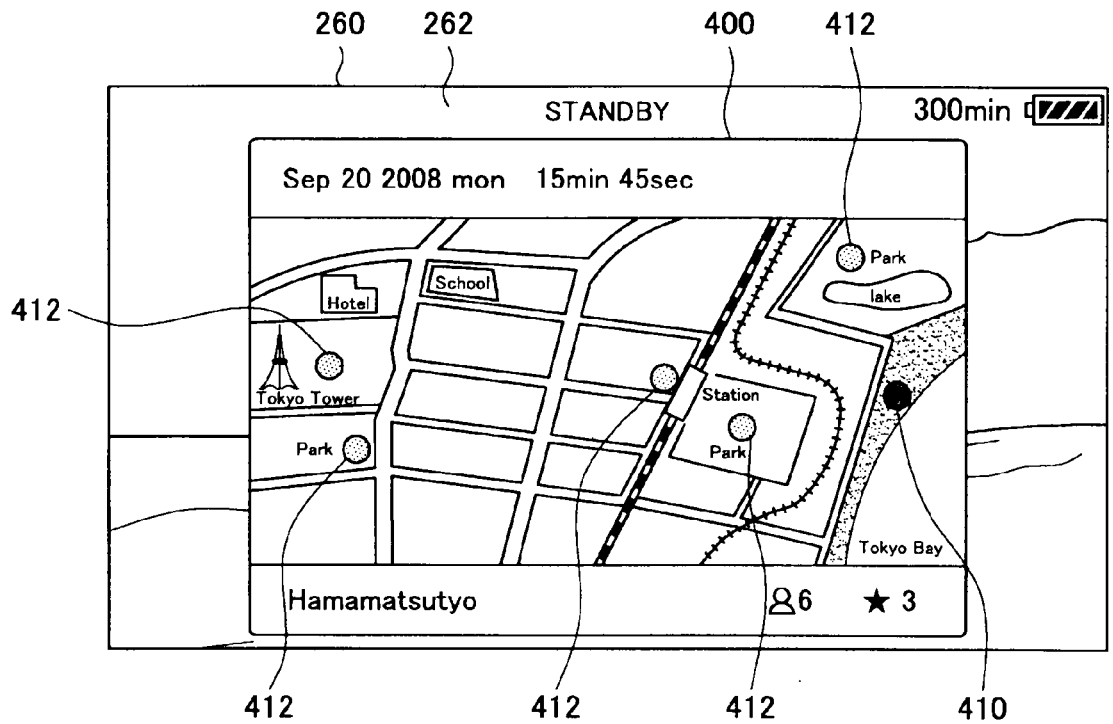
FIG. 9 is a diagram showing a display example of a map screen according to the second embodiment.

Examples of display of recorded image verification screen and map screen Examples of display of the recorded image verification screen 300 and the map screen 400 according to the second embodiment will be explained with reference to FIG. 8 and FIG. 9. FIG. 8 is a diagram showing an example of display of the recorded image verification screen 300 according to the present embodiment, and FIG. 9 is a diagram showing an example of display of the map screen 400 according to the present embodiment.

As shown in FIG. 8, in a similar manner to the above-described first embodiment, the imaging device 10 according to the second embodiment displays the recorded image verification screen 300 on the display screen 260 of the display panel 20 immediately after the end of recording. The nine thumbnail images 310A to 310I are displayed in chronological order in three rows from top to bottom on the recorded image verification screen 300 shown in FIG. 8, and the predetermined number K is nine. The function icons 320 are the same as in the first embodiment. When looking at the recorded image verification screen 300, the user can easily ascertain the whole content of the recorded moving images.

Additionally, after displaying the recorded image verification screen 300 immediately after the end of recording (refer to FIG. 8) for the predetermined period of time Ts, the imaging device 10 according to the second embodiment then displays the map screen 400 (refer to FIG. 9) in place of the recorded image verification screen 300. Furthermore, after displaying the map screen 400 for a predetermined period of time Ts2 (five seconds, for example), the imaging device 10 then removes the map screen 400 and displays the recording standby screen 262. The map screen 400 will be explained in more detail below.

The map screen 400 is a screen onto which marks 410 and 412 are mapped on the map. The marks 410 and 412 represent the image pickup position of one or more moving images recorded presently and in the past relating to a same event. The map screen 400 functions as an image pickup position verification screen to confirm the image pickup position at which the moving images are recorded. In addition, the above-mentioned event is, for example, a single set of events experienced by the user of the imaging device 10, such as a trip, a sports day etc. For example, when the user travels to Tokyo, the user visits sightseeing spots such as Tokyo Tower, the Bay of Tokyo, parks, the Imperial Palace and so on. The trip as a whole that takes in these sightseeing spots is considered to be a single event. When one or more moving images are recorded within the same event, the map screen 400 maps the geographical locations at which the moving images are picked up onto a map. Here, the moving images are the images obtained by a single continuous image pickup and recording operation (also referred to as a "clip"). On the map screen 400 shown in FIG. 9, the mark 410 that represents the image pickup position of the moving images that have just been recorded, and the marks 412 that represent the image pickup positions of others of the moving images that are recorded within the same event are displayed on the map. The mark 410 and the marks 412 are displayed in a different display format (using a different color, for example), and the user can thus distinguish the image pickup position of the moving images for which the recording is currently ended.

The imaging device 10 uses a positioning function (a GPS function, for example) built into the main body of the imaging device 10 to generated the map screen 400. The imaging device 10 can generate the map screen 400, for example, based on position information recorded by the above-described positioning portion 122 during image pickup. More specifically, during the recording period of the moving images (moving image clip), the positioning portion 122 generates the position information, which includes the current position (latitude and longitude, for example) and the movement trajectory of the imaging device 10, multiple times, the information being generated at a chosen time interval (once every minute, for example). Furthermore, the positioning portion 122 stores the generated position information to the memory 242 such that the position information is associated with the recorded moving images. At this time, the position information may be saved, for example, as a database file (an AV index file etc.). After that, when the map screen 400 is displayed, the above-described map screen generation portion 240 generates the map screen 400 by reading out, from the memory 242, a representative position information among the position information for each of the moving images, and by then mapping the image pickup positions for each of the moving images based on the representative position information. Here, the representative position information is, for example, (a) the position information for the beginning of the moving images, (b) a mean value or center value of the position information for all the moving images, and (c) among the position information for all the moving images, the position information of a position on which the moving images are concentrated at a predetermined ratio (80%, for example) or more.

In the above manner, immediately after the end of recording, the imaging device 10 displays the recorded image verification screen 300 of the moving images that have just been recorded, and further displays the map screen 400. Using the map screen 400, the user can check on a map a trajectory of the image pickup positions within a same event. When an event (a trip, for example) occurs, the user picks up the moving images at intended locations and with an intended composition, in accordance with personally decided scenarios. As a result, by display of the map screen 400, an at-a-glance display of the plurality of moving images recorded currently and in the past is shown on the map, and the image pickup position and movement trajectory of each of the moving images is thus presented to the user. In this manner, an impression can be made on the user. In this way, the user's memory is further refreshed, and it is also possible to inhibit the user from forgetting to perform image capture at the user's intended location.

Note that the map screen 400 shown in FIG. 9 functions as a recorded image verification screen to check the image pickup position of the recorded moving images. In the present embodiment, immediately after the recording ends, the recorded image verification screen 300 is first displayed, and after the predetermined period of time Ts elapses, the recorded image verification screen 300 switches to the map screen 400, the map screen 400 being removed after being displayed for the predetermined period of time Ts2. However, the present invention is not limited to this example, and, for example, the type of the map screen 400 shown in FIG. 9 may be included in the recorded image verification screen 300 shown in FIG. 5. In addition, a map icon (not shown in the figures) may be further displayed on the recorded image verification screen 300 shown in FIG. 5, and the user may tap the map icon to switch from the recorded image verification screen 300 to the map screen 400.

Flow of Display of Recorded Image Verification Screen

Figure 10:
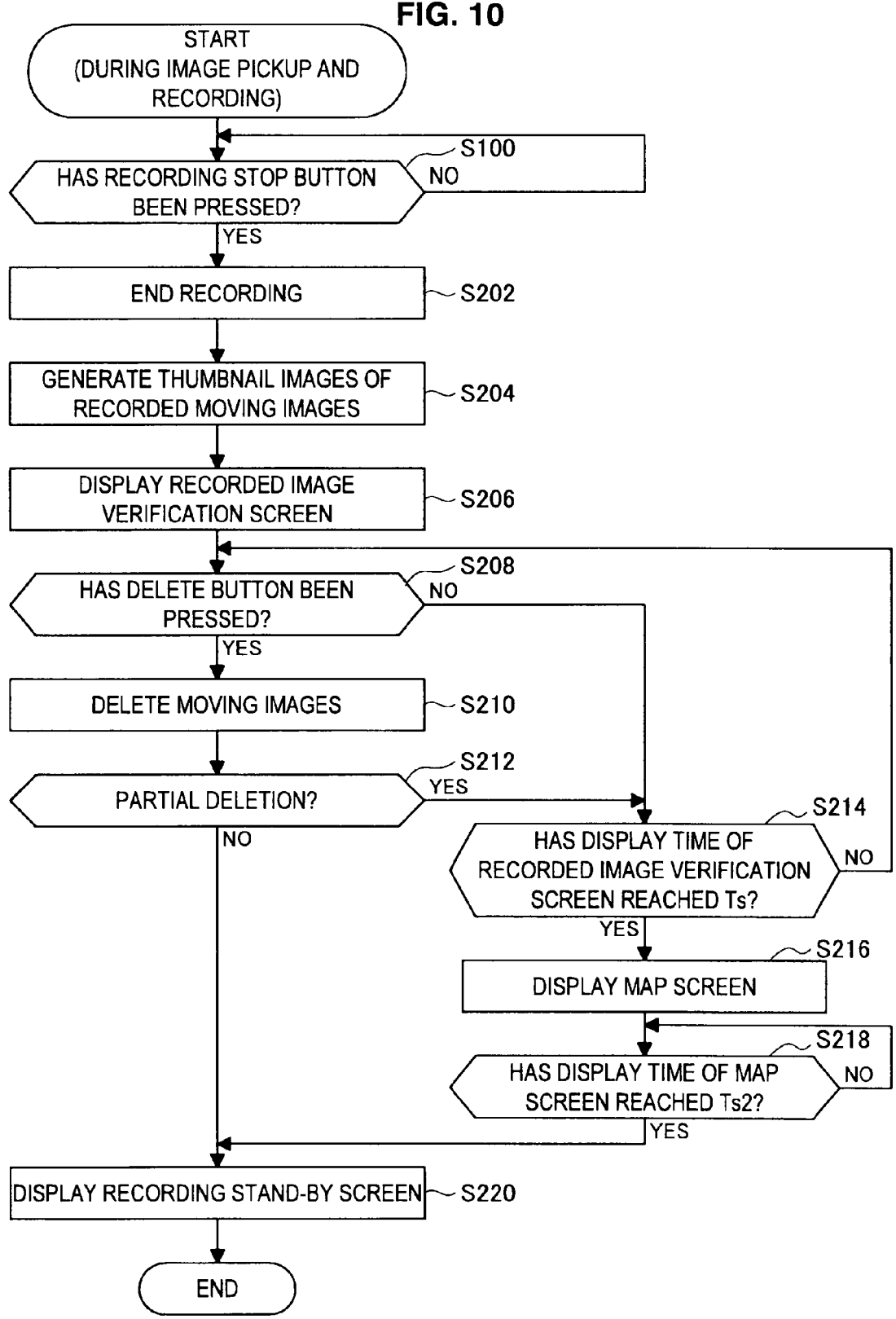
FIG. 10 is a flow chart showing a processing method at the end of recording by the imaging device according to the second embodiment.

Next, a process flow around the end of recording, which includes display of the recorded image verification screen 300 and the map screen 400 on the imaging device 10 according to the second embodiment, will be explained with reference to FIG. 10. FIG. 10 is a flow chart showing a processing method at the end of the recording by the imaging device 10 according to the present embodiment. Note that FIG. 10 shows a process flow in a case in which the delete function is executed using the delete icon 320C of the recorded image verification screen 300 illustrated in FIG. 8.

The process steps S200 to S214 shown in FIG. 10 each correspond to the steps S100 to S114 illustrated in FIG. 7, and a detailed explanation is thus omitted here.

In the flow shown in FIG. 10, after display of the recorded image verification screen 300 at step S206, when there is no user operation of the function icons 320 (no at step S208), or when the moving images have been partially deleted (yes at step S212), the process advances to step S214. At step S214, the imaging device 10 determines whether or not the display time of the recorded image verification screen 300 has reached the predetermined period of time Ts.

When, at step S214, the display time of the recorded image verification screen 300 has reached the predetermined period of time Ts, the imaging device 10 removes the recorded image verification screen 300 and displays the map screen 400 (step S216). The imaging device 10 uses the position information saved by the positioning portion 122 during the recording period to identify each of the image pickup positions of current and past recorded moving images, and maps the mark 410 and the marks 412 that represent the image pickup position for each of the moving images onto the map, thus generating the map screen 400. Then, the imaging device 10 switches the screen displayed on the display panel 20 from the recorded image verification screen 300 to the map screen 400.

After that, the imaging device 10 determines whether or not the display time of the map screen 400 has reached the predetermined period of time Ts2 (step S218). The map screen 400 is continuously displayed until the display time reaches the predetermined period of time Ts2. When, at step S218, the display time of the map screen 400 has reached the predetermined period of time Ts2, the imaging device 10 automatically removes the map screen 400 and displays the recording standby screen 262 (step S220).

The process flow around the end of recording is explained above, with reference to FIG. 10. Note that, in FIG. 10 also, the process flow is illustrated in the case in which the delete function is executed, but the other predetermined functions apart from the delete function, such as the playback function and the rating function, are executed in a similar manner. However, with the playback function or the rating function, after the function is executed (this corresponds to step S210), the imaging device 10 need not necessarily move to the recording standby screen 262 (this corresponds to step S220), but may return to the recorded image verification screen 300 (this corresponds to step S210 to step S214).

3. Third Embodiment

Next, a third embodiment of the present invention will be described. The imaging device 10 according to the third embodiment displays thumbnail images 510 on a recorded image verification screen 500 in a display format that depends on the time length of the section corresponding to each of the thumbnail images 510. Note that in the third embodiment, the display format of the thumbnail images 510 is different to that of the first embodiment, but the rest of the functional structure is substantially the same as in the first embodiment. A detailed explanation is thus omitted here.

Example of Display of Recorded Image Verification Screen

Figure 11:
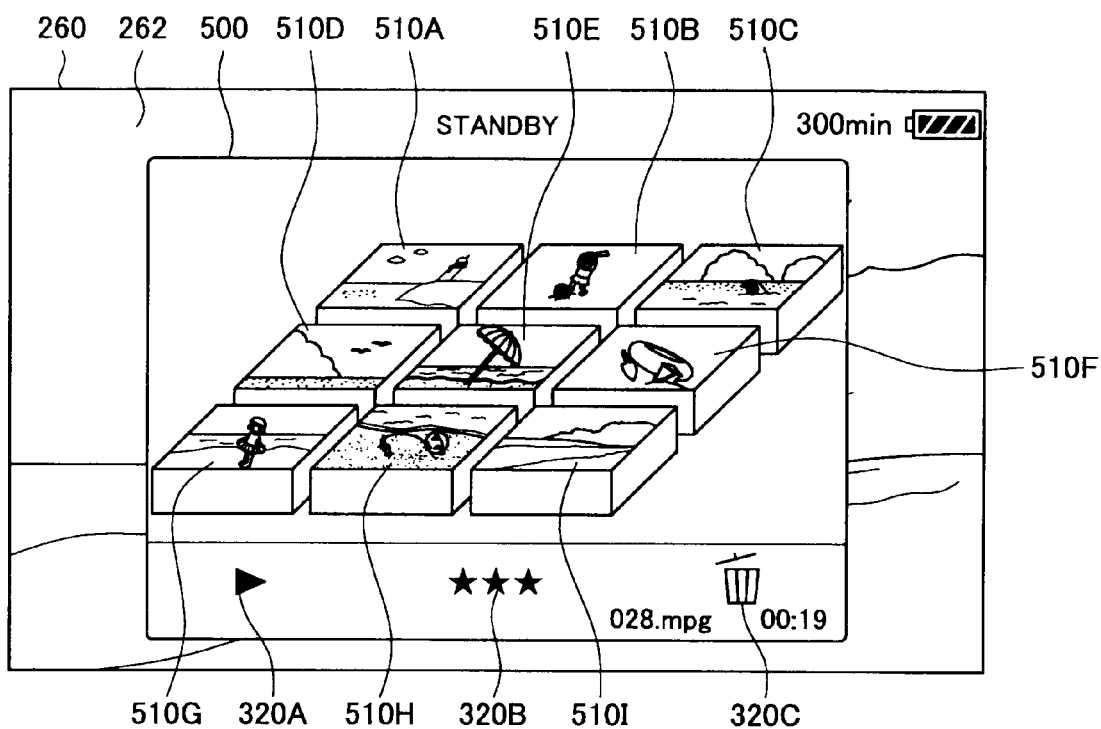
FIG. 11 is a diagram showing a display example of a recorded image verification screen according to a third embodiment of the present invention.
Figure 12:
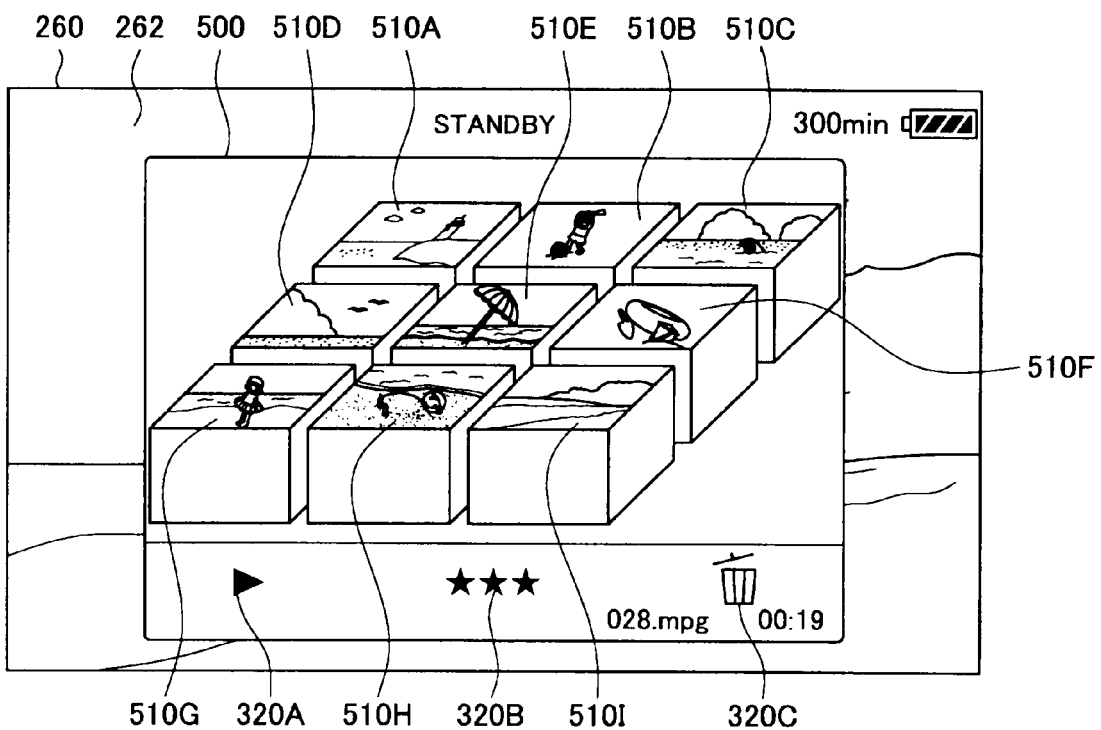
FIG. 12 is a diagram showing a display example of the recorded image verification screen according to the third embodiment.
Figure 13:
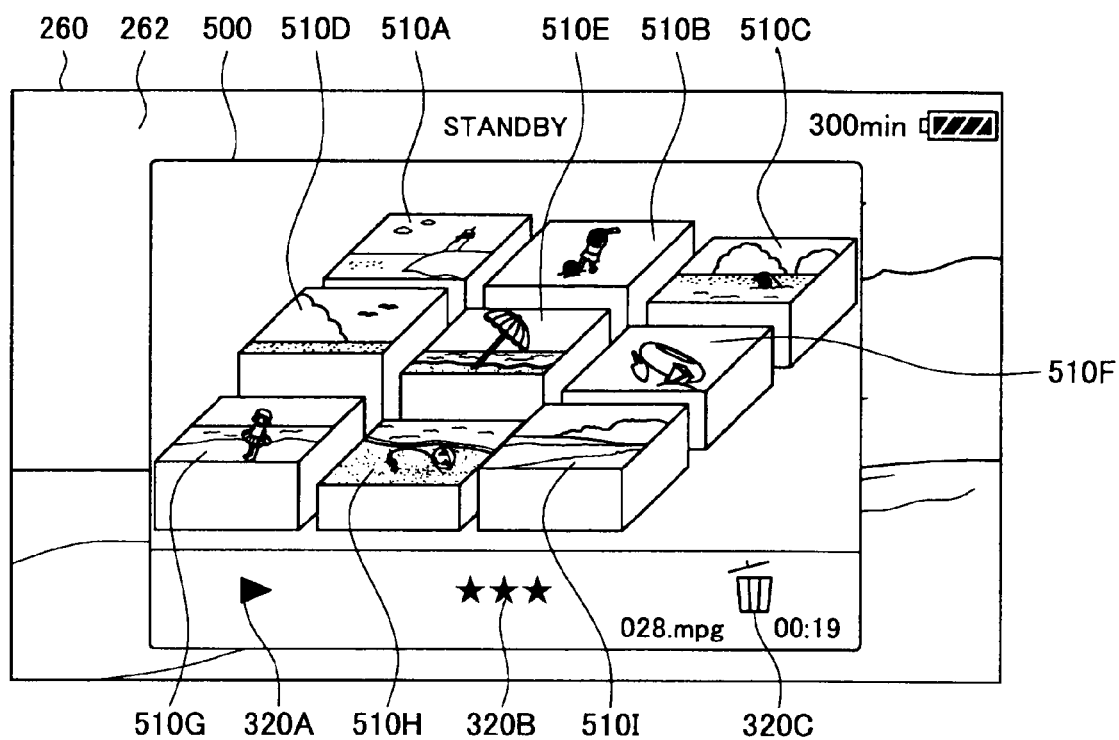
FIG. 13 is a diagram showing a display example of the recorded image verification screen according to the third embodiment.

First, an example of display of the recorded image verification screen 500 according to the third embodiment will be explained with reference to FIG. 11 to FIG. 13. FIG. 11 to FIG. 13 are diagrams showing examples of display of the recording image verification screen 500 according to the present embodiment. FIG. 11 is an example of the recorded image verification screen 500 of the moving images with a short recording time. FIG. 12 is an example of the recorded image verification screen 500 of the moving images with a long recording time, and FIG. 13 is an example of the recorded image verification screen 500 of the moving images that have been time divided into sections with differing time lengths.

As shown in FIG. 11 to FIG. 13, in a similar manner to the first embodiment, immediately after the end of recording, the imaging device 10 according to the third embodiment displays the recorded image verification screen 500 on the display screen 260 of the display panel 20. Nine thumbnail images 510A to 510I are displayed in chronological order in three rows from top to bottom on the recorded image verification screen 500 shown in FIG. 11, and the predetermined number K is nine. Further the function icons 320 displayed on the recorded image verification screen 500 are the same as in the first embodiment (refer to FIG. 5). When looking at the recorded image verification screen 500, the user can easily ascertain the whole content of the recorded moving images.

Further, on the recorded image verification screen 500 according to the third embodiment, each of the thumbnail images 510 are displayed three-dimensionally, and a height of the three-dimensionally displayed thumbnail images 510 is a height that accords with the time length of the section of the moving images corresponding to each of the thumbnail images 510. Advantages of the display format by which the thumbnail images 510 are displayed in this way will be explained below.

As described above in the first embodiment, the display number of the thumbnail images 310 displayed on the recorded image verification screen 300 is constantly the fixed predetermined number K. In the example in FIG. 5, K is six. The reason for this is to enable the user to check the recorded content in a short period of time when the user looks at the recorded image verification screen 300. The number of thumbnail images 310 that can be displayed in an appropriate size on a single screen is limited, and the number of the thumbnail images 310 that can be ascertained at a single glance by the user without scrolling the screen is also limited. Here, whether the time length of the recorded moving images (namely, the recording time) is long or short, the number of the thumbnail images 310 displayed on the recorded image verification screen 300 is fixed as the predetermined number K (six, for example).

However, when the predetermined number K of thumbnail images 310 is simply displayed (refer to FIG. 5), as with the recorded image verification screen 300 according to the first embodiment, a measure of the recording time of the moving images displayed on the recorded image verification screen 300 cannot be ascertained.

In this case, with the recorded image verification screen 500 according to the third embodiment (refer to FIG. 11 and FIG. 12), each of the thumbnail images 510 is displayed three-dimensionally in accordance with the time length of the section corresponding to each of the thumbnail images 510. For example, with the recorded image verification screen 500 shown in FIG. 12, the recording times of the moving images are longer than with the recorded image verification screen 500 shown in FIG. 11, and thus the three-dimensionally displayed thumbnail images 510 have a greater height in FIG. 12 than in FIG. 11. In this way, by looking at the three-dimensional format (height, for example) of the thumbnail images 510 on the recorded image verification screen 500, the user can perform a relative check of the length of the recording time of the moving images. For example, the user can ascertain that the recording times of the moving images in the example in FIG. 12 are longer than the recording times of the moving images in the example in FIG. 11, and can ascertain that the time length of each of the sections into which the moving images are time divided is also longer.

In the examples shown in FIG. 11 and FIG. 12, the moving images are evenly time divided into the predetermined number K of sections, and the time length of each section is therefore the same. For that reason, on the recorded image verification screen 500 relating to a single set of moving images, the height of all the three-dimensionally displayed thumbnail images 510 is the same, as shown in FIG. 11 and FIG. 12.

On the other hand, the recorded image verification screen 500 shown in FIG. 13 shows a case in which the time lengths of each of the sections of the time divided moving images are different. For example, when scene recognition is performed on the recorded moving images and the moving images for each of the recognized scenes are time divided into the predetermined number K of sections, the time length of each of the sections differs in accordance with the length of the corresponding scene. In this case, as shown in FIG. 13, on the recorded image verification screen 500, the three-dimensionally displayed thumbnail images 510 are displayed with differing heights that accord with the time length of the corresponding section (namely, the time length of the scene). For example, the thumbnail image 510A has the greatest height and it is thus understood that the time length of the section corresponding to the thumbnail image 510A is the longest. In contrast, the thumbnail image 510H has the lowest height, and it is thus understood that the time length of the section corresponding to the thumbnail image 510H is the shortest. In this way, the user can ascertain the time length of the section corresponding to each of the thumbnail images 510, which is convenient when performing function operations, such as deletion, playback, rating etc. by each of the sections.

Note that, in the example in FIG. 13, the display format (the height of the three-dimensional display) of the thumbnail images 510 is changed depending on the time length of the section of the moving images corresponding to the thumbnail images 510, but the present invention is not limited to this example. For example, the display format of the thumbnail images 510 may be changed depending on the number of indices attached to the sections. By making the three-dimensional display of the thumbnail image 510 higher the greater the number of indices for the section, the section to which the indices are attached can be emphasized.

Example of Display of Map Screen

Figure 14:
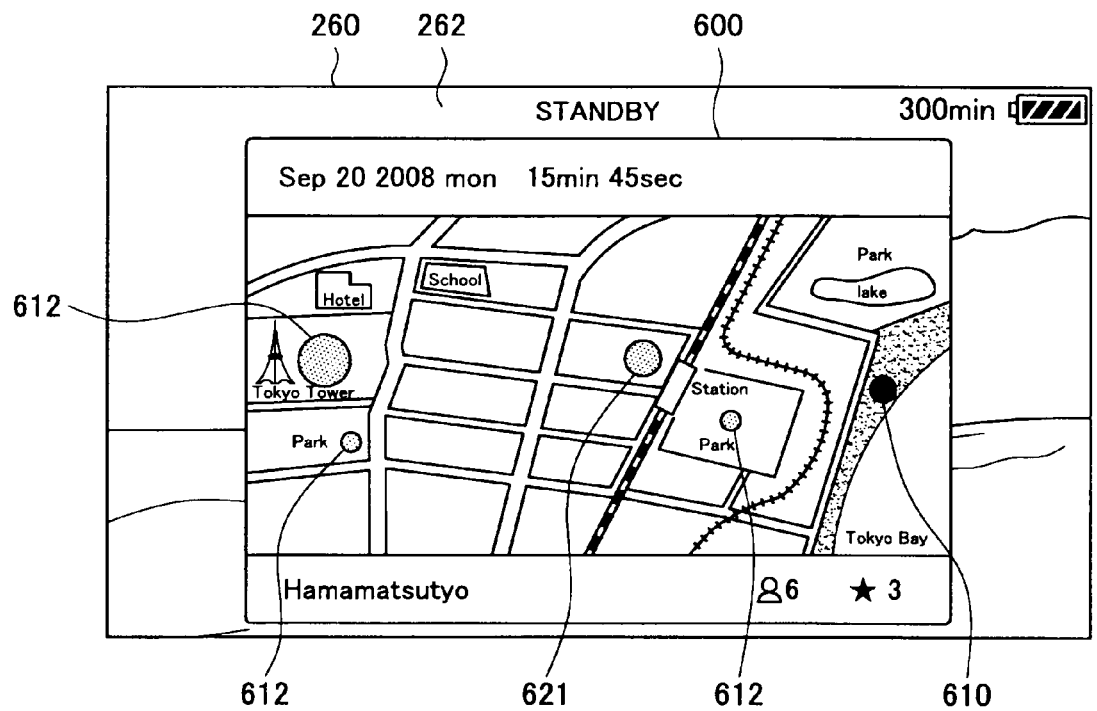
FIG. 14 is a diagram showing a display example of a map screen according to the third embodiment.
Figure 15:
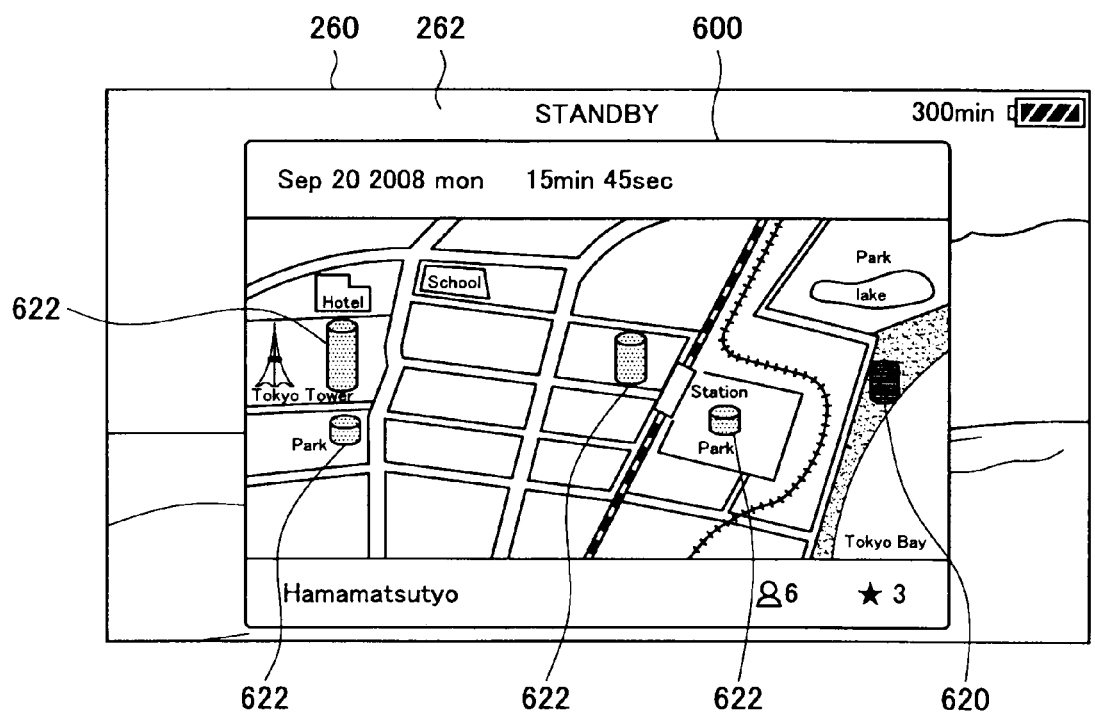
FIG. 15 is a diagram showing a display example of the map screen according to the third embodiment.

Next, examples will be explained with reference to FIG. 14 and FIG. 15 in which marks representing a image pickup position of each of the moving images on a map screen 600 according to the third embodiment are displayed in a display format corresponding to the time length (recording time) of each of the moving images. FIG. 14 is an example in which sizes of circular marks 610 and 612 represent the recording time of the moving images. FIG. 15 is an example in which heights of cylindrical marks 620 and 622 represent the recording time of the moving images. It should be noted that, apart from the display format of the marks, the other functional structures of the map screen 600 according to the third embodiment are substantially the same as for the map screen 400 according to the second embodiment, and a detailed explanation is thus omitted here.

As shown in FIG. 14 and FIG. 15, on the map screen 600 according to the present embodiment, the marks 610, 612, 620 and 622 that represent the image pickup positions of a plurality of moving images recorded within a single event are mapped onto a map and displayed. At this time, the display format of the marks 610, 612, 620 and 622 differs depending on the recording time of the corresponding moving images.

For example, in the example shown in FIG. 14, a diameter of the circular marks 610 and 612 corresponds to the recording time of the moving images, and thus, the larger the diameter of the circular marks 610 and 612, the longer the recording time of the moving images that it represents. Further, in the example shown in FIG. 15, a height of the cylindrical marks 620 and 622 corresponds to the recording time of the moving images, and thus, the greater the height of the cylindrical marks 620 and 622, the longer the recording time of the moving images that it represents.

In this way, in the present embodiment, the marks 610, 612, 620 and 622 that represent the image pickup positions of each of the moving images are displayed on the map screen 600 in the display format that corresponds to the recording time of each of the moving images. As a result, by looking at the map screen 600, the user can ascertain the relative length of the recording time of the plurality of moving images relating to a single event that are recorded currently or in the past. Accordingly, the user can decide a ratio of the recording times of the plurality of moving images and can also decide whether or not the moving images are wanted, which is convenient when editing the moving images etc.

4. Fourth Embodiment

Next, a fourth embodiment of the present invention will be described. In the imaging device 10 according to the fourth embodiment, in response to a specific user operation of two of the thumbnail images 310 on the recorded image verification screen 300, the thumbnail images 310 are further segmentalized and displayed. Note that, in the fourth embodiment, in comparison with the first embodiment, the point of difference is the segmentalized display of the thumbnail images 310, and the rest of the functional structure is substantially the same as in the first embodiment. A detailed explanation is thus omitted here.

Example of Display of Recorded Image Verification Screen

Figure 16:
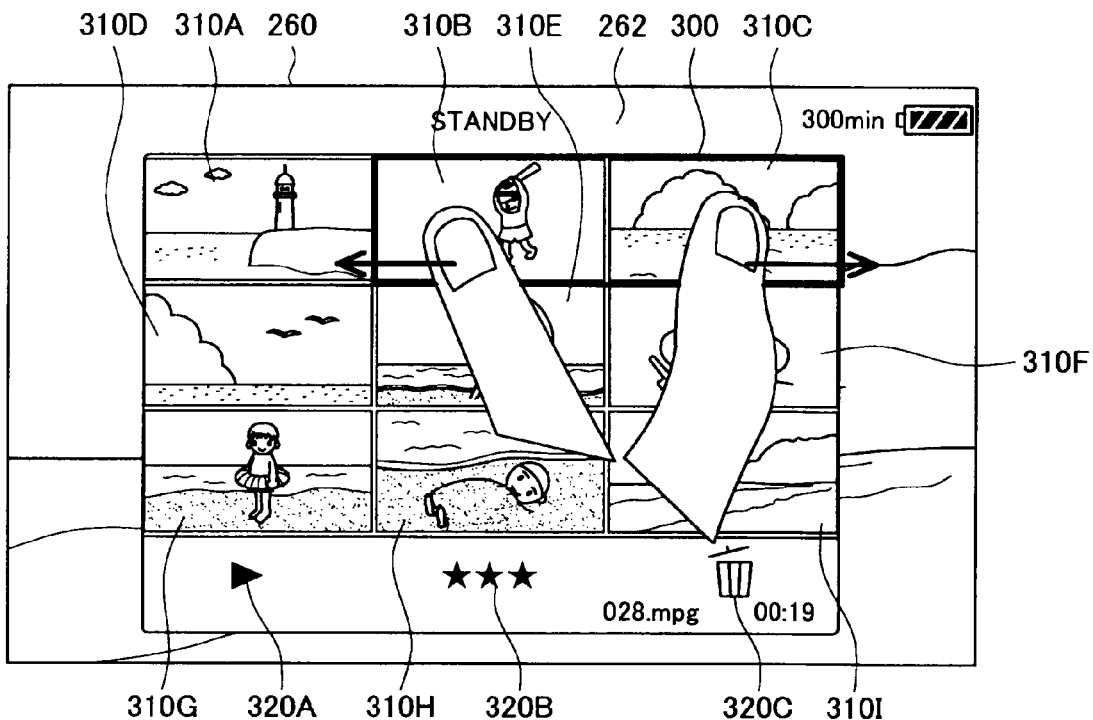
FIG. 16 is a diagram showing a display example of the recorded image verification screen according to a fourth embodiment of the present invention.
Figure 17:
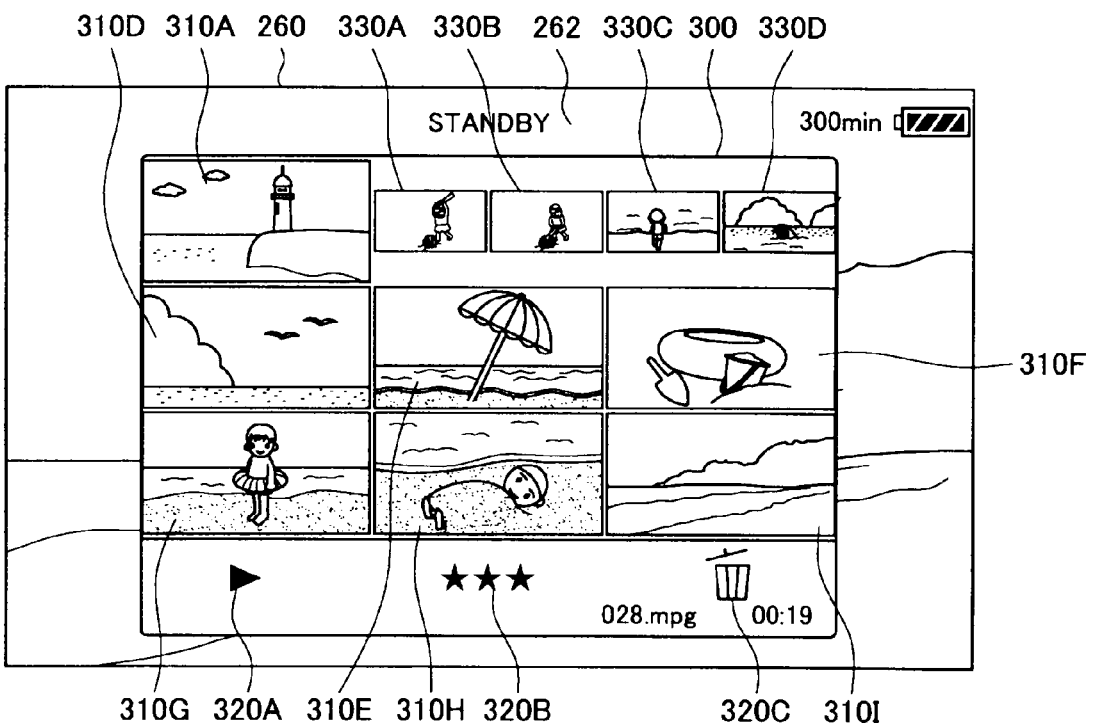
FIG. 17 is a diagram showing a display example of the recorded image verification screen according to the fourth embodiment.
Figure 18:
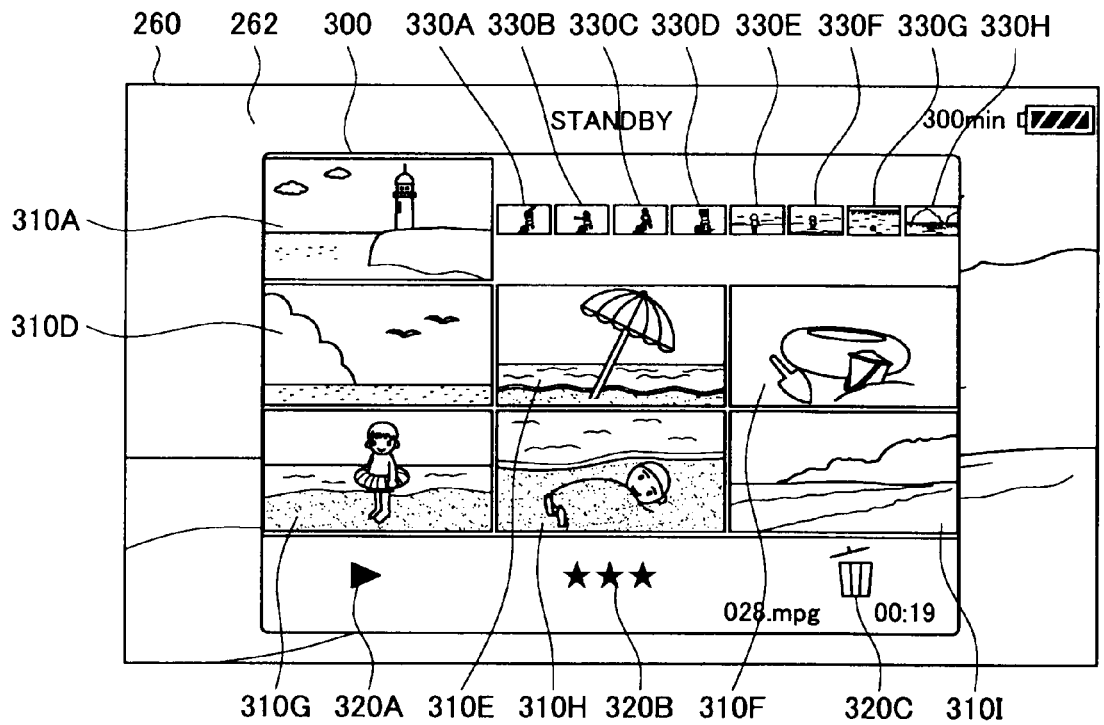
FIG. 18 is a diagram showing a display example of the recorded image verification screen according to the fourth embodiment.
Figure 19:
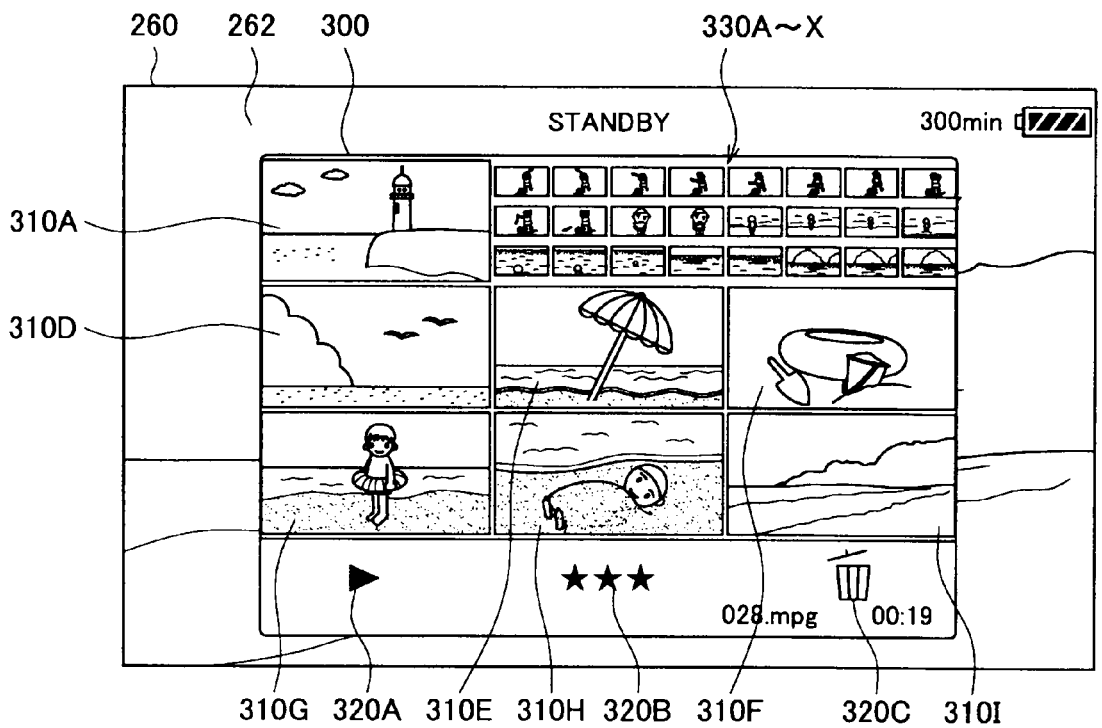
FIG. 19 is a diagram showing a display example of the recorded image verification screen according to the fourth embodiment.

An example of a display of the recorded image verification screen 300 according to the fourth embodiment will be explained with reference to FIG. 16 to FIG. 19. FIG. 16 to FIG. 19 are diagrams showing examples of display of the thumbnail images 310 that have been segmentalized in stages on the recorded image verification screen 300 according to the present embodiment. FIG. 16 shows an example of a specific input operation (pinch out operation) on the recorded image verification screen 300, and FIG. 17 to FIG. 19 are diagrams showing examples of the thumbnail images 310 that have been divided by four, by eight and by sixteen.

As described above in the first embodiment, the plurality of thumbnail images 310 on the recorded image verification screen 300 are still images representing sections obtained by time dividing the recorded moving images. At this time, the number of time division sections is the predetermined number K, and thus the number of the thumbnail images 310 displayed on the recorded image verification screen 300 is also the predetermined number K by default. In this way, by fixing the number of the thumbnail images 310 displayed as the predetermined number K, the predetermined number K of the thumbnail images 310A to 310I can be displayed on the single recorded image verification screen 300 in a suitable size, thus offering the advantage that the overall composition of the moving images can be offered accurately without scrolling the screen. However, with only the predetermined number K of the thumbnail images 310A to 310I on the recorded image verification screen 300, it may not be possible to sufficiently determine the content of the moving images. A case may arise in which the user wishes to check in more detail the content of the sections of the moving images corresponding to a selected two of the thumbnail images 310.

To address such a case, the imaging device 10 according to the fourth embodiment uses the fact that it can detect various user operations by the touch panel 40, and detects the specific input operation (pinch out operation) of the two thumbnail images 310B and 310C on the recorded image verification screen 300. Then, when the specific input operation is detected by the touch panel 40, the imaging device 10 further time divides the two sections of the moving images corresponding to the above-described two thumbnail images 310B and 310C into three or more sub-sections, generates the thumbnail images that have been segmentalized into three or more corresponding to the sub-sections, and displays them on the recorded image verification screen 300.

FIG. 16 shows a state in which the user is performing the specific input operation (pinch out operation) on the two thumbnail images 310B and 310C on the recorded image verification screen 300. As shown in FIG. 16, when the pinch out operation is performed, while touching the two thumbnail images 310B and 310C using two fingers, the user moves the two fingers in a trajectory such that the two thumbnail images 310B and 310C are separated from each other in the left-and-right direction. As well as detecting a position on the display screen 260, the touch panel 40 can also detect a movement trajectory of the operating body, such as a finger etc., and can therefore also detect the above-described pinch out operation.

When the pinch out operation is detected by the touch panel 40 in this way, the imaging device 10 sets the segmentalized sub-sections of the sections corresponding to the two thumbnail images 310B and 310C specified by the pinch out operation. It then generates a plurality of thumbnail images 330 that correspond to the sub-sections. The sub-sections are set such that the time length of the original section is evenly time divided. Furthermore, the thumbnail images 330 may be images of frames extracted at a chosen time point (the beginning, end or middle, for example) of the sub-section. Then, in a region in which the original two thumbnail images 310B and 310C are displayed, the imaging device 10 displays, in chronological order in a smaller size, the plurality of thumbnail images 330 that correspond to the segmentalized sub-sections.

FIG. 17 is an example of a display in which the sub-sections are set by dividing by four the sections corresponding to the thumbnail images 310B and 310C, and the four thumbnail images 330A to 330D corresponding to the four sub-sections are displayed in line in chronological order. In a similar manner, FIG. 18 shows an example of a display in which the sub-sections are set by dividing by eight the sections corresponding to the thumbnail images 310B and 310C, and the eight thumbnail images 330A to 330H corresponding to the eight sub-sections are displayed in line in chronological order. Further, FIG. 19 shows an example of a display in which the sub-sections are set by dividing by twenty-four the sections corresponding to the thumbnail images 310B and 310C, and the twenty-four thumbnail images 330A to 330X corresponding to the twenty-four sub-sections are displayed in three rows in chronological order. The upper left thumbnail image 330A is the thumbnail image of the sub-section at the beginning of the divided twenty-four sub-sections, and the bottom right thumbnail image 330X is the thumbnail image of the end sub-section. When the size of the thumbnail images 330 becomes too small in a single row, the many thumbnail images 330 may be displayed in multiple rows, as shown in FIG. 19.

As described above, by performing the pinch out operation on the two thumbnail images 310B and 310C on the recorded image verification screen 300 shown in FIG. 16, the thumbnail images 330A to 330D divided by four shown in FIG. 17 are displayed. In addition, by performing the pinch out operation on the two thumbnail images 330A and 330D on the recorded image verification screen 300 shown in FIG. 17, the thumbnail images 330A to 330H divided by eight shown in FIG. 18 are displayed. Further, by performing the pinch out operation on the two thumbnail images 330A and 330H on the recorded image verification screen 300 shown in FIG. 18, the thumbnail images 330A to 330X divided by twenty-four shown in FIG. 19 are displayed.

In this way, in response to the pinch out operation by the user, the imaging device 10 sequentially displays the further segmentalized thumbnail images 330 on the recorded image verification screen 300. Thus, by performing the pinch out operation on the thumbnail images 310 on the recorded image verification screen 300 for the sections that the user wishes to see in more detail, the user can see the thumbnail images 330 in which those sections are further segmentalized. As a result, the user can check the content of the recorded moving images in more detail simply by performing a simple operation of tracing the screen on the recorded image verification screen 300 displayed immediately after the end of recording.

Additionally, by combining the segmentalized thumbnail images 330 illustrated in FIG. 16 to FIG. 19 and the above-described function icons 320, it is possible to execute the predetermined functions such as deletion, playback and rating etc. on the moving images that are segmentalized into smaller sections. As a result, accuracy of the editing operation using the recorded image verification screen 300 can be enhanced. For example, the user can specify the segmentalized thumbnail image 330 and play back the moving images of the sub-section, and after checking the content, the user can delete the moving images of the sub-section by dragging and dropping the thumbnail image 330 for the sub-section to the delete icon 320C.

In addition, in contrast to the above-described pinch out operation, the user may perform a pinch in operation. In the pinch in operation, while touching the two thumbnail images 330 with two fingers, the user moves the two fingers in a trajectory such that the two thumbnail images 330 are pulled to be close to each other. When the touch panel 40 detects the pinch in operation, the imaging device 10 returns the segmentalized thumbnail images 330 (refer to FIG. 17 to FIG. 19) on the recorded image verification screen 300 to the thumbnail images 310 (refer to FIG. 16) of the original larger sections. In this way, on the recorded image verification screen 300, the thumbnail images 310 of the recorded moving images can be displayed using a freely selected scale.

CONCLUSION

The imaging device 10 according to the exemplary embodiments of the present invention and the display methods of the recorded image verification screen are explained in detail above. In the present embodiments, immediately after the end of recording by the imaging device 10, the recorded image verification screen 300 is displayed that has both the auto review function of the recorded moving images and the image operating functions that execute the predetermined functions on the moving images.

In this way, while the user's memory is still fresh immediately after recording the moving images, the overall composition of the moving images can be presented to the user in an easy to understand manner. As a result, the user can easily and adequately ascertain the content of the moving images, and can easily determine whether or not the content of the moving images requires editing. In addition, the thumbnail image 310 of the time point to which the index is attached by the user during the recording period is also displayed, and the user can thus more adequately ascertain the recorded content of exciting scenes etc.

In addition, while the user's memory is still fresh immediately after recording the moving images, the user can perform simple operations on the recorded image verification screen 300 to execute the predetermined functions (deletion, playback, rating) on part or all of the moving images. It is therefore possible to handle the moving images more efficiently than in previously known art. In particular, the editing operation to delete unwanted sections of the recorded moving images can be achieved by the simple operation of the touch panel 40 immediately after recording, and thus the efficiency of the editing operation can be significantly improved.

Furthermore, immediately after the recording ends, by displaying the map screen 400 in addition to the recorded image verification screen 300 of the recorded moving images, it is possible to present an at-a-glance display on a map of the plurality of moving images relating to a same event that are recorded currently and in the past. In this way, the user can check the position on the map of the image pickup position of the currently recorded moving images, and can also check the trajectory of the image pickup positions of the other recorded moving images relating to the same event, thus checking on the map how many of the moving images have been recorded up to the present time. By doing this, the pickup location of each of the moving images and the movement trajectory can be impressed on the user, thus refreshing the user's memory and inhibiting the user from forgetting to perform image capture at the user's intended location.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-134417 filed in the Japan Patent Office on Jun. 3, 2009, the entire content of which is hereby incorporated by reference.

What is claimed is:

1. An imaging device comprising:
   circuitry configured to
      record onto a recording medium moving images that are picked up during a recording period from a recording start instruction to a recording stop instruction,
      divide a time length of the moving images that have been recorded into a predetermined number of sections of time, in response to the recording stop instruction,
      generate, from the moving images, a plurality of thumbnail images that represent each of the sections of the moving images, in response to the recording stop instruction,
      display a recorded image verification screen on a display after the recording stop instruction, the plurality of thumbnail images being arranged in an order on the recorded image verification screen, and
      automatically display a map screen on the display after the recorded image verification screen is displayed and after the recording stop instruction.

2. The imaging device according to claim 1, wherein
   the recorded image verification screen further includes at least one function icon that indicates a predetermined function that can be performed on the moving images recorded onto the recording medium, and wherein
   the circuitry is further configured to
      detect a position in which an operating body touches or approaches a display screen of the display, and
      perform the predetermined function corresponding to the function icon on at least some of the sections of the moving images recorded on the recording medium, when the position on the display screen detected by the circuitry during display of the recorded image verification screen corresponds to a display position of the function icon.

3. The imaging device according to claim 2, wherein, when a first position on the display screen detected by the circuitry during display of the recorded image verification screen corresponds to a display position of at least one thumbnail image among the plurality of thumbnail images, and when a second position on the display screen detected by the circuitry corresponds to a display position of the function icon, the circuitry performs the predetermined function corresponding to the function icon on the section of the moving images that corresponds to the at least one thumbnail image.

4. The imaging device according to claim 2, wherein
   the predetermined function includes at least one of
      a function that deletes at least some of the sections of the moving images recorded on the recording medium,
      a function that assigns an evaluation value to at least some of the sections of the moving images recorded on the recording medium, and
      a function that plays back at least some of the sections of the moving images recorded on the recording medium.

5. The imaging device according to claim 1,
   wherein the circuitry is further configured to detect a position in which an operating body touches or approaches a display screen of the display, and
   wherein, when a predetermined input operation performed on two thumbnail images among the plurality of thumbnail images on the recorded image verification screen is detected by the circuitry, the circuitry is further configured to set at least three sub-sections that are obtained by segmenting the sections of the moving images corresponding to the two thumbnail images, generate at least three thumbnail images corresponding to each of the sub-sections, and display the at least three thumbnail images on the recorded image verification screen.

6. The imaging device according to claim 1, wherein the circuitry displays each of the thumbnail images on the recorded image verification screen in a display format that accords with a time length of the section corresponding to each of the thumbnail images.

7. The imaging device according to claim 1, wherein the circuitry is further configured to
   receive an index instruction,
   generate index information indicating a time point at which the index instruction is input during the recording period, and
   extract as a thumbnail image a frame of the time point indicated by the index information, from among the moving images picked up during the recording period.

8. The imaging device according to claim 7, wherein the circuitry is further configured to display the thumbnail image, which is associated with the frame of the time point indicated by the index information, in a distinguished fashion from other thumbnail images of the plurality of thumbnail images.

9. The imaging device according to claim 1, wherein the circuitry is further configured to
- measure a current position of the imaging device during the recording period and generate position information indicating the current position of the imaging device, wherein the map screen includes a map onto which an image pickup position of the moving images is mapped in accordance with the position information.

10. The imaging device according to claim 1, wherein, when the plurality of thumbnail images are displayed on the recorded image verification screen, the circuitry is configured to display the plurality of thumbnail images one by one in reverse chronological order.

11. The imaging device according to claim 1, wherein the recording stop instruction stops a recording of the moving images, and the circuitry displays the recorded image verification screen on the display in response to the recording stop instruction.

12. The imaging device according to claim 1, wherein the circuitry is further configured to automatically display a stand-by screen after the map screen is displayed for a predetermined period of time.

13. An image processing method, comprising:
- recording onto a recording medium moving images that are picked up during a recording period from a recording start instruction to a recording stop instruction;
- dividing a time length of the moving images that have been recorded into a predetermined number of sections of time, in response to the recording stop instruction;
- generating, from the moving images, a plurality of thumbnail images that represent each of the sections of the moving images, in response to the recording stop instruction; and
- displaying a recorded image verification screen on a display after the recording stop instruction, and the plurality of thumbnail images being arranged in an order on the recorded image verification screen, and the displaying displays the recorded image verification screen with a recording standby screen.

14. The imaging processing method according to claim 13, wherein
- the displaying displays the recorded image verification screen on the display for a predetermined amount of time, and
- the displaying displays a map screen on the display after the predetermined amount of time of displaying the recorded image verification screen has elapsed, the map screen including a map onto which an image pickup position of the moving images is mapped in accordance with position information of the imaging device during the recording period.

15. The imaging processing method according to claim 13, wherein
- the displaying displays a map screen on the display immediately after the recorded image verification screen is displayed,
- the map screen includes a map onto which a mark representing an image pickup position of the moving images is displayed in accordance with position information of the imaging device during the recording period, and a size of the mark varies based on the time length of the moving images, a longer time length of the moving images being represented by a mark of a larger size than a mark representing a shorter time length.

16. The image processing method according to claim 13, wherein the recording standby screen is a recording live view screen.

17. A non-transitory computer-readable storage medium encoded with a program that comprises instructions that command a computer to perform a method comprising:
- recording onto a recording medium moving images that are picked up during a recording period from a recording start instruction to a recording stop instruction;
- dividing a time length of the moving images that have been recorded into a predetermined number of sections of time, in response to the recording stop instruction;
- generating, from the moving images, a plurality of thumbnail images that represent each of the sections of the moving images, in response to the recording stop instruction; and
- displaying a recorded image verification screen on a display after the recording stop instruction, and the plurality of thumbnail images being arranged in an order on the recorded image verification screen, and the displaying displays the recorded image verification screen with a recording standby screen.

18. An imaging device comprising:
circuitry configured to
- record onto a recording medium moving images that are picked up during a recording period from a recording start instruction to a recording stop instruction,
- divide a time length of the moving images that have been recorded into a predetermined number of sections of time, in response to the recording stop instruction,
- generate, from the moving images, a plurality of thumbnail images that represent each of the sections of the moving images, in response to the recording stop instruction, and
- display a recorded image verification screen on a display portion after the recording stop instruction, and the plurality of thumbnail images being arranged in an order on the recorded image verification screen, wherein the circuitry is configured to display the recorded image verification screen with a recording standby screen.

19. An imaging method comprising:
- recording onto a recording medium moving images that are picked up during a recording period from a recording start instruction to a recording stop instruction;
- dividing a time length of the moving images that have been recorded into a predetermined number of sections of time, in response to the recording stop instruction;
- generating, from the moving images, a plurality of thumbnail images that represent each of the sections of the moving images, in response to the recording stop instruction;
- displaying a recorded image verification screen on a display after the recording stop instruction, the plurality of thumbnail images being arranged in an order on the recorded image verification screen; and
- automatically displaying a map screen on the display after the recorded image verification screen is displayed and after the recording stop instruction.

* * * * *